(12) United States Patent  
Valimaki et al.

(10) Patent No.: US 9,191,615 B1  
(45) Date of Patent: Nov. 17, 2015

(54) CHAT WINDOW

(75) Inventors: Mikko Tapio Valimaki, Orem, UT (US); Morgan Ivan Lynch, Cedar Hills, UT (US); Kristen Dame Knight, Pleasant Grove, UT (US)

(73) Assignee: NEEDLE, INC., Bluffdale, UT (US)

( * ) Notice: Subject to any disclaimer, the term of this patent is extended or adjusted under 35 U.S.C. 154(b) by 370 days.

(21) Appl. No.: 13/462,704

(22) Filed: May 2, 2012

Related U.S. Application Data

(60) Provisional application No. 61/481,718, filed on May 2, 2011.

(51) Int. Cl.
 *H04N 7/14* (2006.01)
 *H04L 12/58* (2006.01)
 *H04M 3/51* (2006.01)
 *G06Q 30/06* (2012.01)

(52) U.S. Cl.
 CPC ........... *H04N 7/141* (2013.01); *G06Q 30/0643* (2013.01); *H04L 12/581* (2013.01); *H04M 3/5191* (2013.01)

(58) Field of Classification Search
 CPC ......... H04N 7/141; H04N 7/147; H04N 7/15; H04N 7/152; H04L 12/581
 USPC .............. 348/14.03, 14.01, 14.07; 379/93.12, 379/93.17, 93.21
 See application file for complete search history.

(56) References Cited

U.S. PATENT DOCUMENTS

| | | | |
|---|---|---|---|
| 8,135,126 B2 * | 3/2012 | Shafiee et al. ........... | 379/265.09 |
| 8,386,340 B1 * | 2/2013 | Feinstein .................... | 705/27.1 |
| 8,576,178 B2 * | 11/2013 | Kim et al. .................... | 345/173 |
| 2009/0153646 A1 * | 6/2009 | Bourguignon et al. .... | 348/14.11 |
| 2010/0083143 A1 * | 4/2010 | Bigley ......................... | 715/758 |
| 2010/0332603 A1 * | 12/2010 | Sun et al. ..................... | 709/206 |
| 2011/0246910 A1 * | 10/2011 | Moxley et al. ................ | 715/758 |
| 2011/0249081 A1 * | 10/2011 | Kay et al. .................. | 348/14.03 |
| 2011/0249086 A1 * | 10/2011 | Guo et al. .................. | 348/14.12 |
| 2012/0324375 A1 * | 12/2012 | Mathews ...................... | 715/760 |
| 2013/0066750 A1 * | 3/2013 | Siddique et al. ............. | 705/27.2 |
| 2014/0201181 A1 * | 7/2014 | Agarwal et al. ............... | 707/706 |

OTHER PUBLICATIONS

Office Action mailed May 9, 2014 for U.S. Appl. No. 13/462,711.

* cited by examiner

*Primary Examiner* — Stella L Woo
(74) *Attorney, Agent, or Firm* — Maschoff Brennan

(57) ABSTRACT

A chat window. In one example embodiment, a chat window is configured to facilitate communication between a visitor of a website and an agent of the website. The chat window includes a text chat region and an interactive region configured to display to the visitor one or more products selected by the visitor. The interactive region includes one or markup tools that enables the visitor to markup the one or more products during a chat with the agent.

7 Claims, 25 Drawing Sheets

Chat Console — Company X companyx.needle.com — 400

Team Stats — 402

| Name | Online | Avail. | Max | Cur. | Tot. | SCS | ?s | Sat | Remain |
|---|---|---|---|---|---|---|---|---|---|
| Kristen | 0:03:41 S | Away | 3 | 0 | 4 | 0 | 1.8 | 0 | 2:28:26 |
| Brogan | 1:43:56 C | Ready | 2 | 2 | 23 | 1 | 1.6 | 6.4 | 0:49:19 |

Team Chat — 404

Brogan: thanks! you too
Brogan: So.. when someone types just plain old "PHONE" it says Phone. That's a little confusing.
Brogan: Hmm. four chats when my max is at two

Team Room | julio ⊗

Visitor Profile — 410

Visits: 1  Pageviews: 16  Purchases: 10
Hobbies: Click To Edit
Email: Click To Edit
Name: julio
Age:
Gender:
Music:
Other:

Pages: 23(16) 13:49
Location: Paulebo WA US
Referrer: Google with "Company X"

Black Headphones All 1 — Search — 412

0 item(s) in the cart

— 420 julio: nice
Company X Store
Brogan: For sure. Are there any other headphones you like besides the NBA Lakers?  0 search
Company X Store
julio: I like the Ti's, but don't like the colors that they come with.  0 search — 432
Shoe Blue Headphones-All Products
Brogan: Oh bummer. Have you used the Ti's before or just like the look of them?  0 search — 434
Black Denim Headphones-All Products  1 search — 436 julio: these black deni — 428

— 426
— 418

Chat Duration: 10:59
Questions Asked: 2  — 422

Select An Action
Go    Cancel

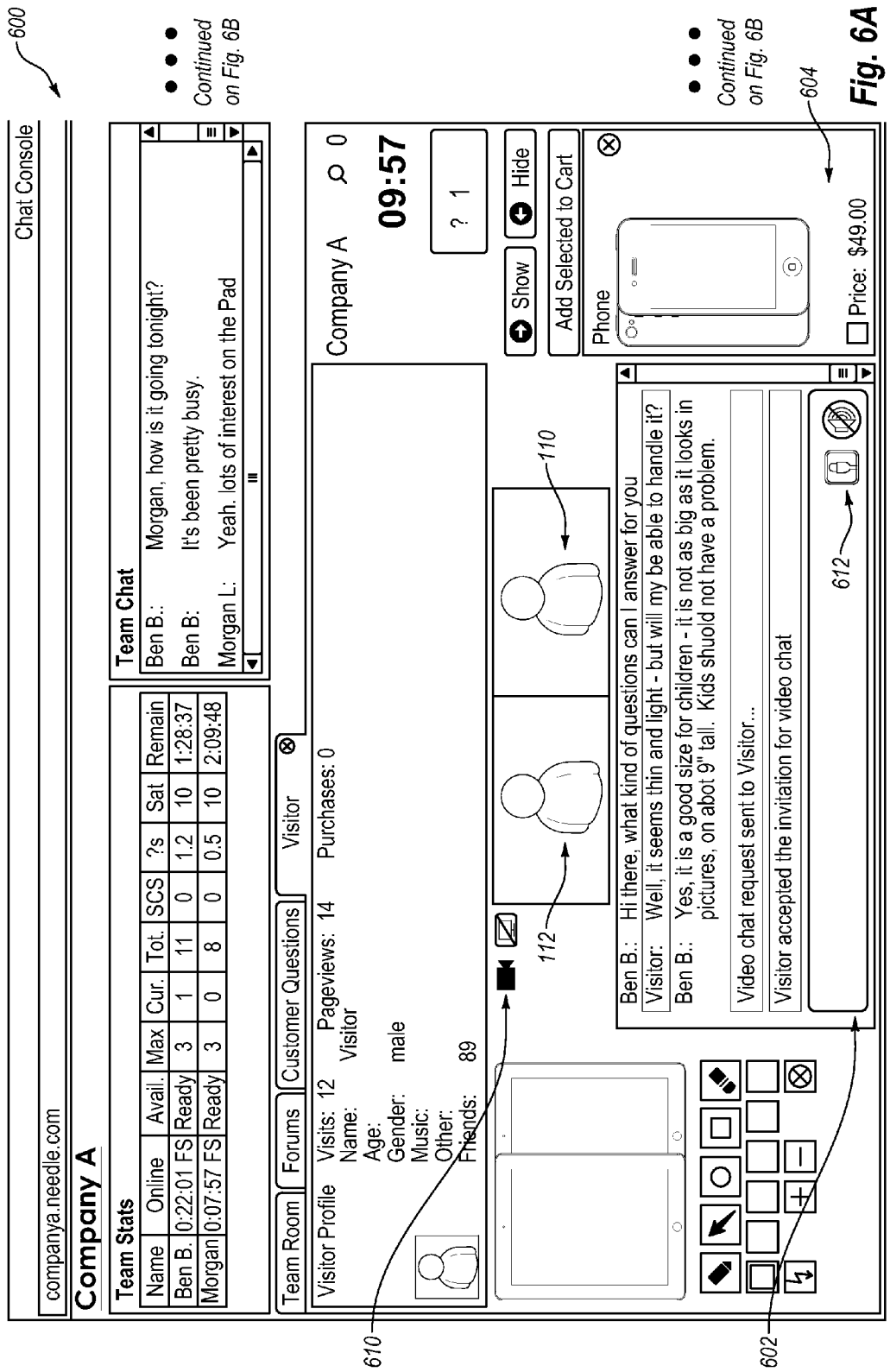

the pincushion companyf.needle.com

Online Retailer Community Window

Jessie J.    Needler Since: 2010
Score 9.0 | 7,825 Points | My Profile | Inbox (0) | Logout

| The Cushion | Scheduler | Training | FAQs | The Store | Refer/Invite |

Welcome Needlers

Customer Feedback

- (10) Jordan Harper - Company X
  4-6-2011  Spencer
  "promotionnnnnnnn"

- (10) John - Company X
  4-6-2011  Ben K.
  "make a fsu pair of agents"

View All Feedback

Company X

This Week's Leaders

| | | Blocks Complete | Avg. Points Per Block |
|---|---|---|---|
| ① | Stephanie | 2 | 425 |
| 2 | Spencer | 2 | 400 |
| 3 | Ben K. | 2 | 325 |

Last Week's Leaders

| | | Blocks Complete | Avg. Points Per Block |
|---|---|---|---|
| ① | Ben A. | 2 | 462 |
| 2 | Spencer | 2 | 418 |
| 3 | Nick | 2 | 325 |

Launch Chat

Welcome Needlers

No news is good news! You've acknowledged all of these so far....

- ☑ Bug Reports
  - March 29, 2011

Partner Updates

Nothing to see here.  But, just for reference... here are the latest partner updates you have verified so far.

- ☑ Spring Launch Date Changed
  - March 29, 2011

My Status
Current Level:

0

Block: 0 of 24
Chat Time Remaining: 2h16m26s
Current Block Stats:    Chats: 10    SAT Score: 9.0

| Block Point System Block = 3 Hours Active Chat Time | | Stack Point System Stack = 24 Blocks | |
|---|---|---|---|
| Sat score > 9.5 | 100 | Sat score > 9.3 | 2000 |
| Sat score = 9.2 - 9.49 | 50 | Sat score = 9.1 -9.29 | 1000 |
| Average Response time<22 sec | 100 | Conversion < 15% | 3000 |
| Average Response time=23-26 sec | 100 | Conversion 12–15% | 2000 |
| Purchase during active chat (each) | 200 | Conversion 10-12% | 500 |
| ?s/chat > 3 | 200 | Average Order Value > $77 | 1000 |
| ?s/chat 2.5-3 | 100 | Total chats > 860 (12/hour) | 1000 |
| Missed chat (each) | -100 | Total chats > 795 (11/hour) | 500 |
| Total chats > 30 | 100 | | |
| Facebook coupon posts (each) | 25 | | |

Team Members
- Carly M.  S  1/1  1
- Lisa E.   C  1/1  1
- Emily D.  C  1/1  1
- Mikko V. N  0/1  0

Status: Ready ▶  Capacity:
Block: 0 of 24
QPC: -
Sat: -             Me     Team
Chats: -           0%
SCS: -           Network:          0

⊗ Sign Out

Product | Customer | History | FAQ | Metrics

Since: April 24, 2012
⚠ April 24, 20121 3:07pm Intro-bail after 20.0 s
⚠ April 24, 20121 3:27pm Intro-bail after 2 m 45.0 s
💬 April 24, 20121 3:37pm with Ana W. for 24 m 43.0 s

822

| luella:   | hi, how are you? |
| Anna W.: | i just want to ask if until when it ends the sale for pearl rainboots? thanks |
| Anna W.: | Welcome! |
| Anna W.: | Our sale will go until all are sold out |
| luella:   | oh i see, do you still have lots of stock though? |
| luella:   | why the shipping cost too much? |
| Anna W.: | I don't have access to the stock number, as the sale is going on, our site is constantly updating |
| luella:   | oh ok |
| Anna W.: | Our shipping is based on where the items are going. I know the pricing is different for Canada |
| Anna W.: | What size do you wear? |

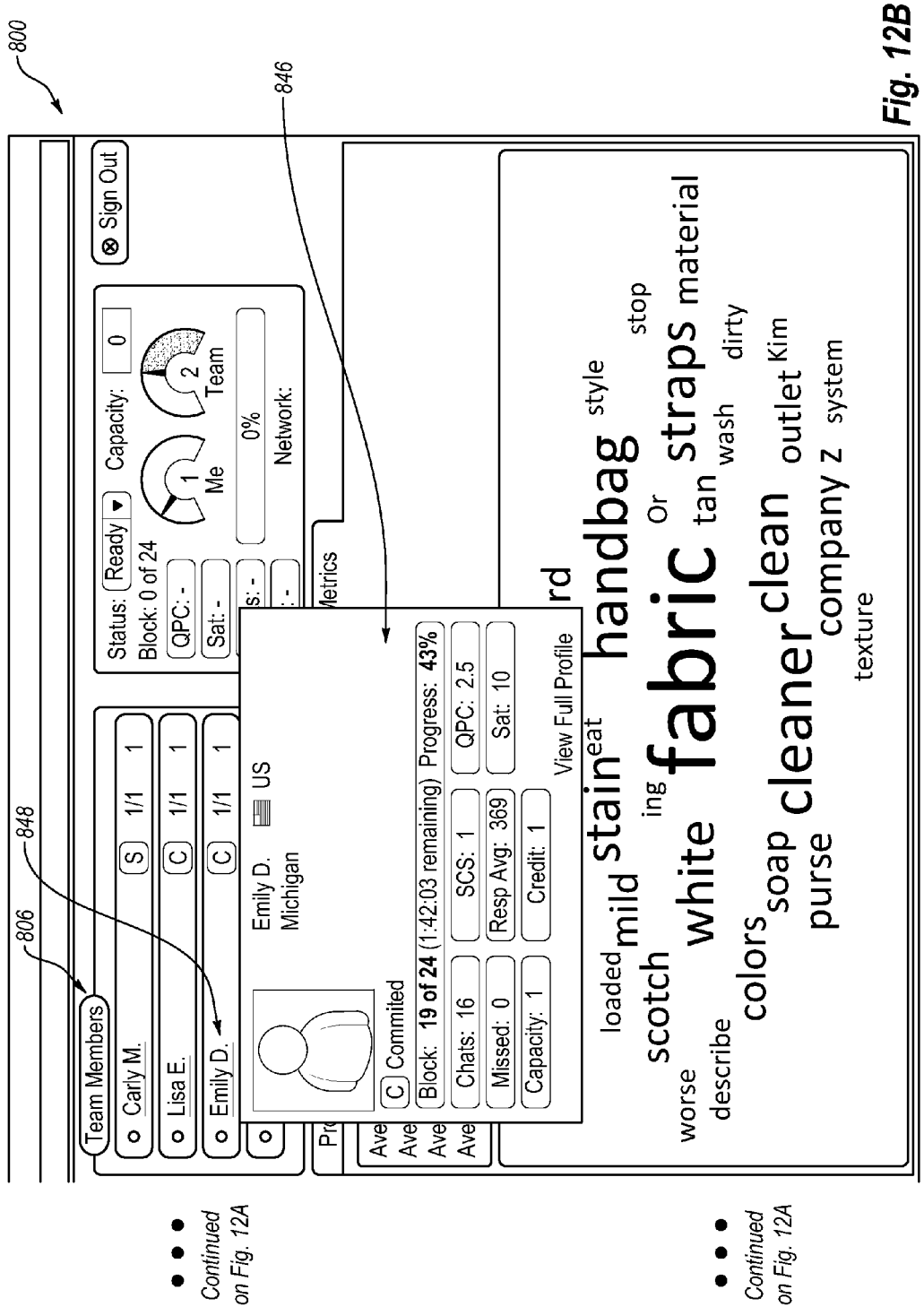

Team Members
○ Mikko V.    [N][F]  3/1  0

Status: [Ready ▶]  Capacity: 0
Block: 0 of 24
QPC: -           Me  Team
Sat: -            1    2
Chats: -        Network: 0%
SCS: -

⊗ Sign Out

Peer Review

Rate the needler on this interaction overall?
◉ Poor   ○ Average   ○ Good

How well did the needler use the tools that were available?
◉ Poor   ○ Average   ○ Good What do you think the customer thought of this converstation?
◉ Poor   ○ Average   ○ Good What feedback do you have for the needler?

Peer Reviews Given

Partner: [Company X ▶]   Date Picker: [Apr 25, 2012]   (Submit)

(Export)

| Needler Reviews Received | | | | | Customer Review | | | Overall Review | | | Tool Review | | |
|---|---|---|---|---|---|---|---|---|---|---|---|---|---|
| Date | Needler | Chats | Tags | Survey Delta | Good | Average | Poor | Good | Average | Poor | Good | Average | Poor |
| Wed April 25, 2012 | Abby | 1 | 0 | 2 | 1 | 0 | 0 | 1 | 0 | 0 | 1 | 0 | 0 |
|  | Ben A. | 1 | 1 | 0 | 0 | 1 | 0 | 1 | 0 | 0 | 1 | 0 | 0 |
|  | Cameron L. | 2 | 4 | 4 | 2 | 0 | 0 | 2 | 0 | 0 | 0 | 2 | 0 |
|  | Davis | 1 | 0 | 2 | 1 | 0 | 0 | 1 | 0 | 0 | 1 | 0 | 0 |
|  | Elisa A. | 5 | 0 | 4 | 3 | 2 | 0 | 3 | 2 | 0 | 3 | 2 | 0 |
|  | Greg N. | 1 | 0 | 5 | 1 | 0 | 0 | 1 | 0 | 0 | 1 | 0 | 0 |
|  | Mitch | 2 | 0 | 4 | 2 | 0 | 0 | 2 | 0 | 0 | 2 | 0 | 0 |
|  | Noah S. | 1 | 0 | 2 | 0 | 1 | 0 | 0 | 1 | 0 | 1 | 0 | 0 |
| Total: | | 14 | 5 | 23 | 10 | 4 | 0 | 11 | 3 | 0 | 10 | 4 | 0 |

*Fig. 15*

CHAT WINDOW

CROSS REFERENCE TO A RELATED APPLICATION

This application claims priority to and the benefit of U.S. Provisional Patent Application Ser. No. 61/481,718, filed on May 2, 2011.

BACKGROUND

Website customer support and sales support has traditionally been accomplished by providing website visitors with a telephone number that the visitors call to reach an agent of the website to discuss the needs of the visitor. While telephone communication remains a valid option for website customer support and sales support, some visitors prefer a somewhat less intrusive method of communication for accessing customer support or sales support, such as email or chat systems.

Chat systems enable an agent of a website, such as a sales agent or a support agent, and a visitor of the website to send short text messages back and forth using chat windows. For example, a visitor can use a traditional chat window to solicit additional information about a product that is offered for sale on the website before purchasing the product. A visitor can also use a traditional chat window to solicit help with a problem with a product that the visitor previously purchased from the website.

Unfortunately, existing chat systems do not provide an agent with the same tools possessed by agents in traditional brick-and-mortal retail stores. For example, existing chat systems do not allow a sales agent to "size up" the visitor or the product as is possible in a face-to-face sales pitch. Instead, existing chat systems limit the interaction between a sales agent and a visitor to a text chat interaction. This limitation to a text chat interaction inhibits the type and quantity of information that can be conveyed between the sales agent and the visitor and thereby inhibits the sales agent's ability to sell products to the visitor.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments of the invention relate to a chat window configured to facilitate communication between a visitor of a website and an agent of the website. In at least some example embodiments, the chat window provides visual and/or audible elements in addition to text chatting capabilities in order to enhance the type and quantity of information that can be conveyed between the agent and the visitor and thereby enhance the agent's ability sell website products to the visitor.

In one example embodiment, a chat window is configured to facilitate communication between a visitor of a website and an agent of the website. The chat window includes a text chat region and an interactive region configured to display to the visitor one or more products selected by the visitor. The interactive region includes one or markup tools that enables the visitor to markup the one or more products during a chat with the agent.

In another example embodiment, a chat window is configured to facilitate communication between a visitor of a website and an agent of the website. The chat window includes a text chat region and a tray region configured to display to the visitor one or more products selected by the agent.

In yet another example embodiment, a chat window is configured to facilitate communication between a visitor of a website and an agent of the website. The chat window includes a text chat region, a voice chat region configured to allow the visitor to enable either a one-way or a two-way voice chat, and a video chat region configured to allow the visitor to enable either a one-way or a two-way video chat.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which:

FIGS. 4A and 4B are a first example chat console;

FIGS. 6A and 6B are a second example chat console;

FIG. 7A is an example online retailer community window;

FIG. 7B is a chart of an example point reward system for agent behaviors;

FIGS. 9A and 9B is a second view of the third example chat console of FIGS. 8A and 8B;

FIGS. 12A and 12B are a fifth view of the third example chat console of FIGS. 8A and 8B;

FIGS. 14A and 14B are a seventh view of the third example chat console of FIGS. 8A and 8B; and FIG. 15 is an example peer review report generated from input received in the seventh view of FIGS. 14A and 14B of the third example chat console of FIGS. 8A and 8B.

DETAILED DESCRIPTION OF SOME EXAMPLE EMBODIMENTS

Example embodiments of the invention relate to a chat window configured to facilitate communication between a visitor of a website and an agent of the website. In at least some example embodiments, the chat window provides visual and/or audible elements in addition to text chatting capabilities in order to enhance the type and quantity of information that can be conveyed between the agent and the visitor and thereby enhance the agent's ability to sell website products to the visitor.

Embodiments of the invention are implemented in the form of various online software applications such as web server software applications. Embodiments of the invention can include special purpose and general-purpose computing devices having various computer hardware and software. At least some embodiments can also include computer-readable media for carrying or having computer-executable instructions or data structures stored thereon. Computer-executable instructions comprise, for example, instructions and data which cause a general purpose computer, special purpose computer, or special purpose processing device to perform a certain function or group of functions.

Computer-readable media, on the other hand, can be any available media that can be accessed by the processor(s) of a general purpose or special purpose computer. By way of example, and not limitation, such computer-readable media can comprise RAM, ROM, EEPROM, CD-ROM or other optical disk storage, magnetic disk storage or other magnetic storage devices, or any other non-transient medium which can be used to carry or store desired program code means or modules in the form of computer-executable instructions or data structures and which can be accessed by the processor(s) of a general purpose or special purpose computer.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Communication System

Figure 1:
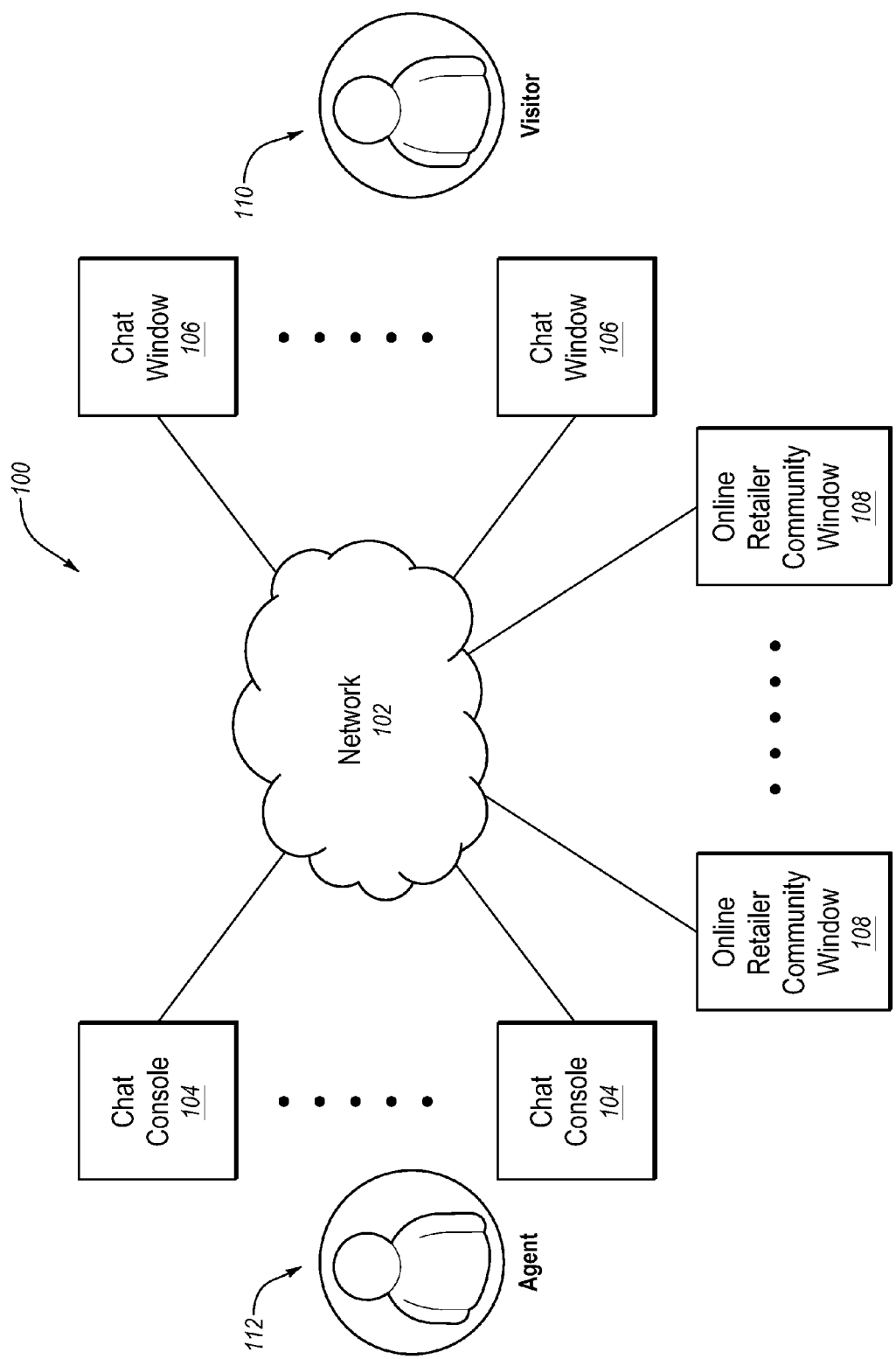
FIG. 1 is a schematic view of an example communication system.
Figure 2:
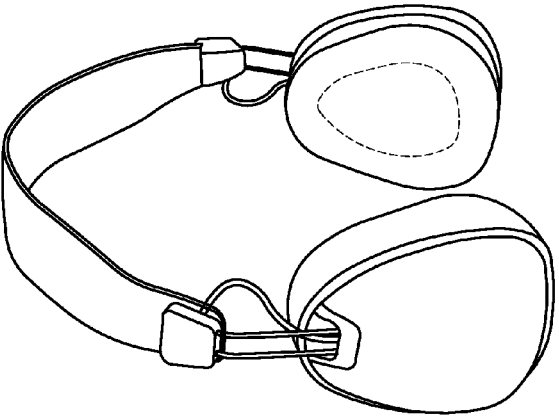
FIG. 2 is an example webpage of the website of an example online retailer.

Reference is first made to FIG. 1 which discloses aspects of an example communication system 100. The communication system 100 facilitates communication between a human agent 112 of a website and a human visitor 110 of the website. The website may be operated, for example, by an online retailer, an online training company, an online proselytizing organization, or an online social networking community. Therefore, although the example communication system 100 is disclosed herein in connection with one or more online retailers, it is understood that aspects of the communication system 100 can also be employed in connection with other online endeavors, and the use of the example communication system 100 is not limited to use with online retailer sales support agents and customer support agents.

In some example embodiments, an online retailer of goods and/or services (products) can employ the communication system 100 to provide an "in-store" shopping experience online, complete with product demonstrations, as discussed in greater detail below. The example communication system 100 includes a network 102, a plurality of chat consoles 104, a plurality of chat windows 106, and a plurality of online retailer community windows 108.

The network 102 facilitates the communication of data between the windows and consoles 104, 106, and 108. The network 102 can be any type of network including a LAN, a WAN, an intranet, the Internet, or some combination thereof.

Each chat console 104 enables agent(s) of an online retailer to chat with one or more visitors of the online retailer using chat window(s) 106 to sell or offer products of the online retailer to the visitor(s) and/or to provide customers support to the visitor(s). Additional details regarding the chat consoles 104 and chat windows 106 will be disclosed herein in connection with FIGS. 2-6B and 8A-14B.

Each online retailer community windows 108 enable the agent 112 of the online retailer to communicate with other agents and with other personnel of the online retailer or enable personnel of the online retailer to communicate with and manage a workforce of agents. Additional details regarding the online retailer community windows 108 will be disclosed herein in connection with FIGS. 7A, 7B, and 15.

2. First Example Webpage, Chat Window, and Chat Console

Figure 3:
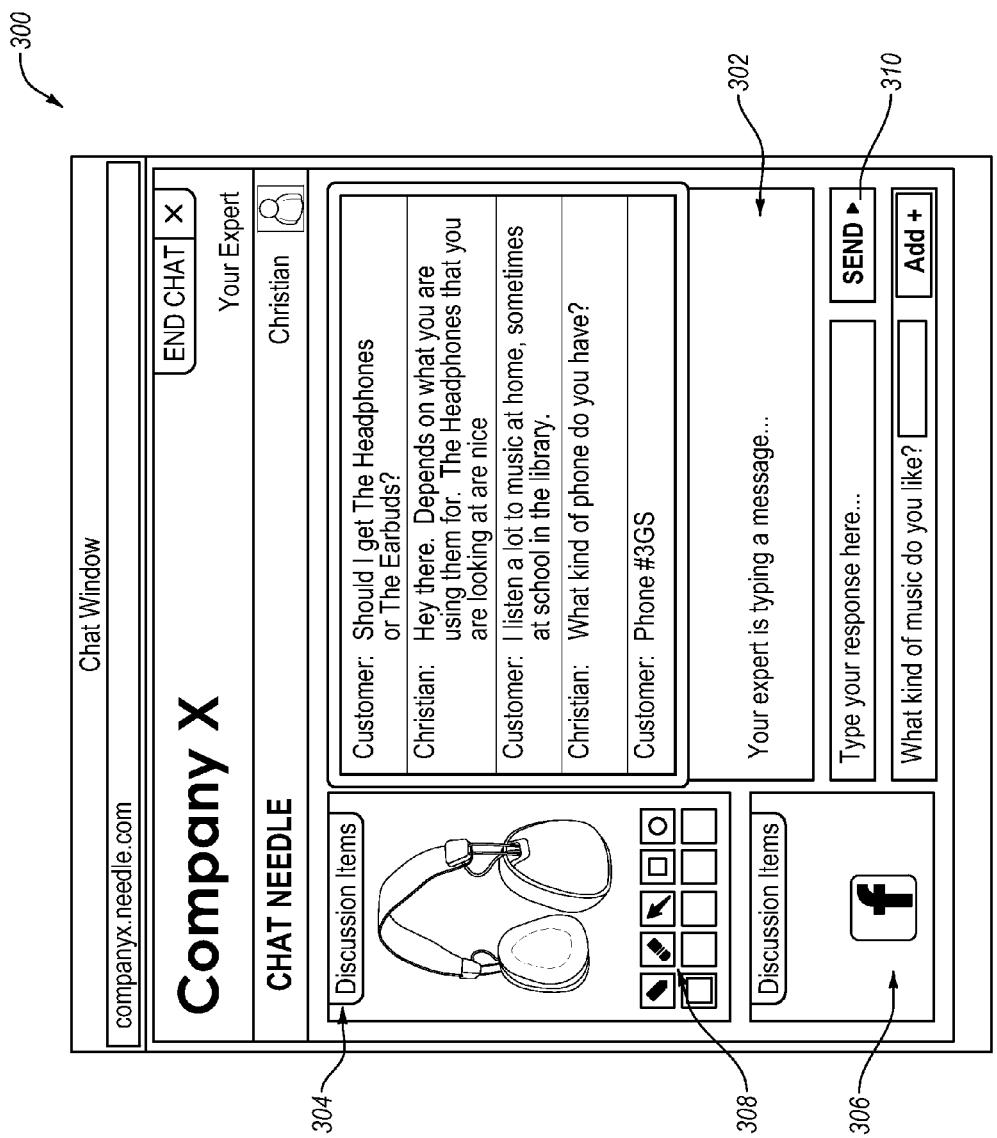
FIG. 3 is a first example chat window.
Figure 4B:
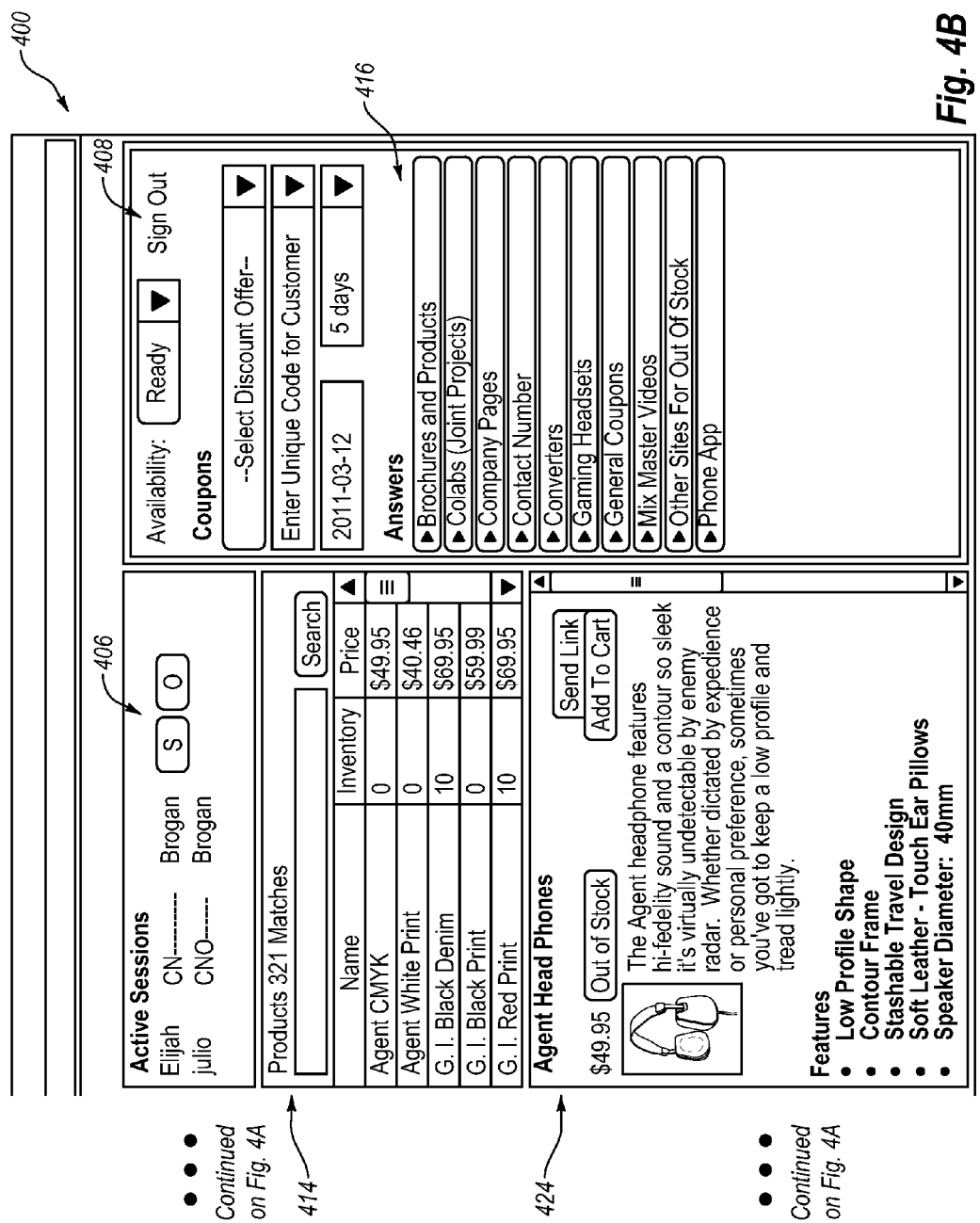

With reference now to FIGS. 1-4B, additional details regarding a first example chat console 104 and chat window 106 will be disclosed. In particular, FIG. 2 discloses an example webpage 200 of a website of an example online retailer "Company X", FIG. 3 is a first example chat window 300, and FIGS. 4A and 4B are a first example chat console 400.

The webpage 200 offers a particular set of headphones for sale. Visitors who navigate to the webpage 200 can be qualified as "likely purchasers" using a rules engine. The rules engine can qualify a visitor based on various factors including, but not limited to, agent availability, visitor purchasing history, visitor locations, visitor navigation history, visitor demographics, or time of day.

Once a particular visitor is qualified, such as the visitor 110, the visitor 110 can be presented with an invitation to chat with an agent of the online retailer. This invitation can be presented in various ways, including as a banner 202 that invites the visitor to "CHAT ABOUT THIS PRODUCT." Upon the visitor's acceptance of an invitation to chat with an agent, such as by the visitor clicking on the banner 202 for example, the communication system 100 launches a new chat window 106 in connection with one or more agent consoles 104.

For example, as disclosed in FIGS. 3 and 4, a new chat window 106 can be displayed to the visitor 110 as a chat window 300 and the chat console 104 can simultaneously be displayed to the agent 112 as a chat console 400. While the visitor 110 interacts with the agent 112 using the chat window 300 disclosed in FIG. 3, the agent 112 interacts with the visitor 110 using the chat console 400 disclosed in FIGS. 4A and 4B.

The chat window 300 includes various regions that facilitate communication between the visitor 110 and the agent 112. For example, the chat window 300 includes a text chat region 302, an interactive region 304, and a special offers region 306.

The text chat region 302 can be used by the visitor 110 to text chat back and forth with the agent 112. The text chat region 302 can display text communication, such as text entered by the agent 112 and text entered by the visitor 110, including hotlinks to specific URLs entered by the visitor 110 or the agent 112.

The interactive region 304 may be employed to display one or more images representing products and/or services of the online retailer website that were selected by the visitor 110. For example, the interactive region 304 in FIG. 3 is displaying the headphones selected by the visitor 110. The headphones were selected by the visitor 110 by navigating to the webpage 200 of FIG. 2 where the headphones are offered for sale by the website of the online retailer "Company X". The interactive region 304 may also include one or markup tools 308 that enable the visitor to markup the one or more products during a chat with the agent. For example, during the chat between the visitor 110 and the agent 112, the visitor 110 may wish to highlight, circle, emphasize, or otherwise modify the image of the headphones displayed in the interactive region 304 in order to enhance the type and/or quantity of information that can be conveyed by the visitor 110 to the agent 112. In at least some example embodiments, any markup of the image in the interactive region 304 by the visitor 110 is simultaneously displayed to the agent 112 in the interactive region 418.

As disclosed in FIGS. 3 and 4, the interactive region 304 of the chat window 300 is in communication with a similar interactive region 418 of the agent console 400. The second interactive region 418 is configured to display the one or more products selected by the visitor 110 to the agent 112 and also includes one or markup tools 426 that enable the agent 112 to markup the one or more products during a chat with the visitor 110. For example, during the chat between the agent 112 and the visitor 110 in an enhanced text chat region 420, the agent 112 may wish to highlight, circle, emphasize, or otherwise modify the image of the headphones displayed in the interactive region 418 in order to enhance the type and/or quantity of information that can be conveyed by the agent 112 to the visitor 110. In at least some example embodiments, any markup of the image in the interactive region 418 by the agent 112 is simultaneously displayed to the visitor 110 in the interactive region 304. The interactive regions 304 and 418 can thus enhance the discussion going on in the text chat region 302 and the enhanced text chat 420. In particular, the interactive region 418 enables the agent 112 to demonstrate various features of displayed products or services to the visitor 110. Together, the interactive region 418 and the interactive region 304 may act as a 2-way whiteboard for interactive feature discussions.

The special offers region 306 includes a social networking button that enables the visitor 110 to "like" the products and/or services displayed in the interactive region 304 on a social networking website associated with the product. The special offers region 306 can also include buttons that invite various social networking behaviors like Merchant "Likes," Tweets, posts, event RSVPs, etc. The special offers region 306 also enables the agent 112 to present the visitor 110 with special offers. The special offers can be coupon codes or other incentives that encourage the visitor 110 to make a purchase from the online retailer, for example.

The chat console 400 may include various regions that facilitate communication between the agent 112 and the visitor 110. For example, the chat console 400 includes a team statistics region 402, a team text chat region 404, an active sessions region 406, a coupon generator region 408, a visitor information region 410, a visitor history region 412, a product catalog region 414, a common answers region 416, an interactive region 418, an enhanced text chat region 420, a behavior tracking region 422, and a product detail region 424.

The team statistics region 402 displays agents that are currently logged in to the chat console 400. The statistics region 402 also displays the current status of each agent and the capacity load of the communication system 100.

The team text chat region 404 allows the agent 112 to ask questions and get help from other agents during or after sessions with visitors.

The active sessions region 406 displays a snapshot of all active chats and enables supervisor agents to jump in to participate in any chat or just observe.

The coupon generator region 408 allows the agent 112 to generate personalized coupons to create a sense of urgency and drive sales. Promotional rules can be custom configured for each online retailer.

The visitor information region 410 displays information about the visitor 110. The visitor information region 410 can be populated (and saved), for example, from Facebook connect (or any social network authorization platform), mini-interest surveys or the agent 112.

The visitor history region 412 can display visitor pathing, visitor click stream, visitor history, and visitor shopping cart information. The visitor history region 412 provides the agent 112 with insight into the visitor 110.

The product catalog region 414 allows the agent 112 to search a product catalog of the online retailer in order to find relevant products, answers to questions about products, send links, and drop product in the shopping cart of the visitor 110 with minimal response time.

The common answers region 416 allows the agent 112 to quickly find answers to common questions and make response time fast and training thorough.

The enhanced text chat region 420 corresponds to and is in communication with the text chat region 302 of the chat window 300. Like the text chat region 302, the enhanced text chat region 420 can display text communication, such as text entered by the agent 112 and text entered by the visitor 110, including hotlinks to specific URLs entered by the visitor 110 or the agent 112. Unlike the text chat region 302, however, the enhanced text chat region 420 is also configured with various enhanced communication features.

For example, the enhanced text chat region 420 may be configured to analyze text entered by the visitor 110 in the text chat region 302 of the chat window 300 in order to display to the agent 112 highlighted terms among the text entered by the visitor 110. The highlighted terms may relate to, or be various misspellings of terms that relate to, one or more products in the product catalog. The highlighted terms, such as the highlighted term 432, may be configured to cause, upon selection by the agent 112, the one or more related products to be displayed in the product catalog region 414 and/or in the product detail region 424.

The enhanced text chat region 420 may further be configured to analyze text entered by the agent 112 in the enhanced text chat region 420 in order to display a number, in the behavior tracking region 422 for example, representing a total number of phrases among the text entered by the agent 112 that are identified as questions asked by the agent 112. The number of questions asked by the agent 112 in each chat may be tracked in order to encourage agents to ask questions which can result in increased sales.

The enhanced text chat region 420 may further be configured to analyze text entered by the visitor 110 in the text chat region 302 of the chat window 300 in order to display look-ahead text 428 that is entered by the visitor 110 into the text chat region 302 of the chat window 300 as the text is entered and prior to the submission of the entered text. In this example, the submission of the entered text can be accomplished by the visitor 110 selecting the send button 310 in the chat window 300. This look-ahead functionality may enable the agent 112 to respond more quickly to questions of the visitor 110.

The enhanced text chat region 420 may further be configured to display a click stream of the visitor 110 that tracks the clicks of the visitor 110 interspersed between lines of text entered by the visitor into the text chat region 302 of the chat window 300. For example, the click stream 434 is displayed in the enhanced text chat region 420 and represents the clicks of the visitor 110 prior to the visitor's entering of the text 436. Further, selection of the click stream by the agent 112 may be configured to cause one or more products displayed on a terminal webpage of the click stream to be displayed in the product catalog region 414. For example, selection of the click stream 434 by the agent 112 may be configured to cause the "shoe blue" headphones displayed on the terminal webpage of the click stream 434 to be displayed in the product catalog region 414 and/or in the product detail region 424.

The click streams displayed in the enhanced text chat region 420 may also display other actions taken by the visitor 110 such as what the visitor 110 is placing in the shopping cart, how the visitor 110 is navigating the website of the online retailer, what the visitor 110 is searching for on the website of the online retailer, and the social networking behaviors of the visitor 110, such as whether the visitor 110 has posted chat-related items to the visitor's social networking website (not shown).

The enhanced text chat region 420 also allows the agent 112 to bring in one or more other available agents to chat with the visitor 110. Thus, the enhanced text chat region 420 allows the agent 112 to instigate and manage a three-way or higher chat between multiple agents and the visitor 110. This multiple-agent chat functionality can be helpful when the visitor 110 asks a question of the agent 112 but another agent is better equipped to answer the visitor's question. The enhanced text chat region 420 further allows the agent 112 to transfer the chat to another agent so that the agent 112 can bow out of the chat entirely.

The behavior tracking region 422 can display behaviors of the agent 112 that are tracked and incentivized by the online retailer, such as asking questions or engaging in chats that continue for an extended length of time. These behaviors can be presented in a color-coded format to convey additional information to the agent 112.

The product detail region 424 can display information about a product that the agent 112 is trying to sell to the visitor 110 or support for the visitor 110. For example, the product detail region 424 can display information such as inventory status, product features, and other information from the product catalog. The "Send Link" button in the product detail region 424 pushes a link to that product page directly into the enhanced text chat region 420 for display to the visitor 110 in the text chat region 302. The "Add to Cart" button places the product in the shopping cart of the visitor 110.

The agent console 400 may also include a supervisor observation mode where a supervisor can view the console window 400 assigned to a particular agent while the agent is actively chatting with live visitors. This supervisor observation enables anonymous monitoring and performance evaluation of the agents of the online retailer.

3. Second Example Chat Window and Chat Console

Figure 5:
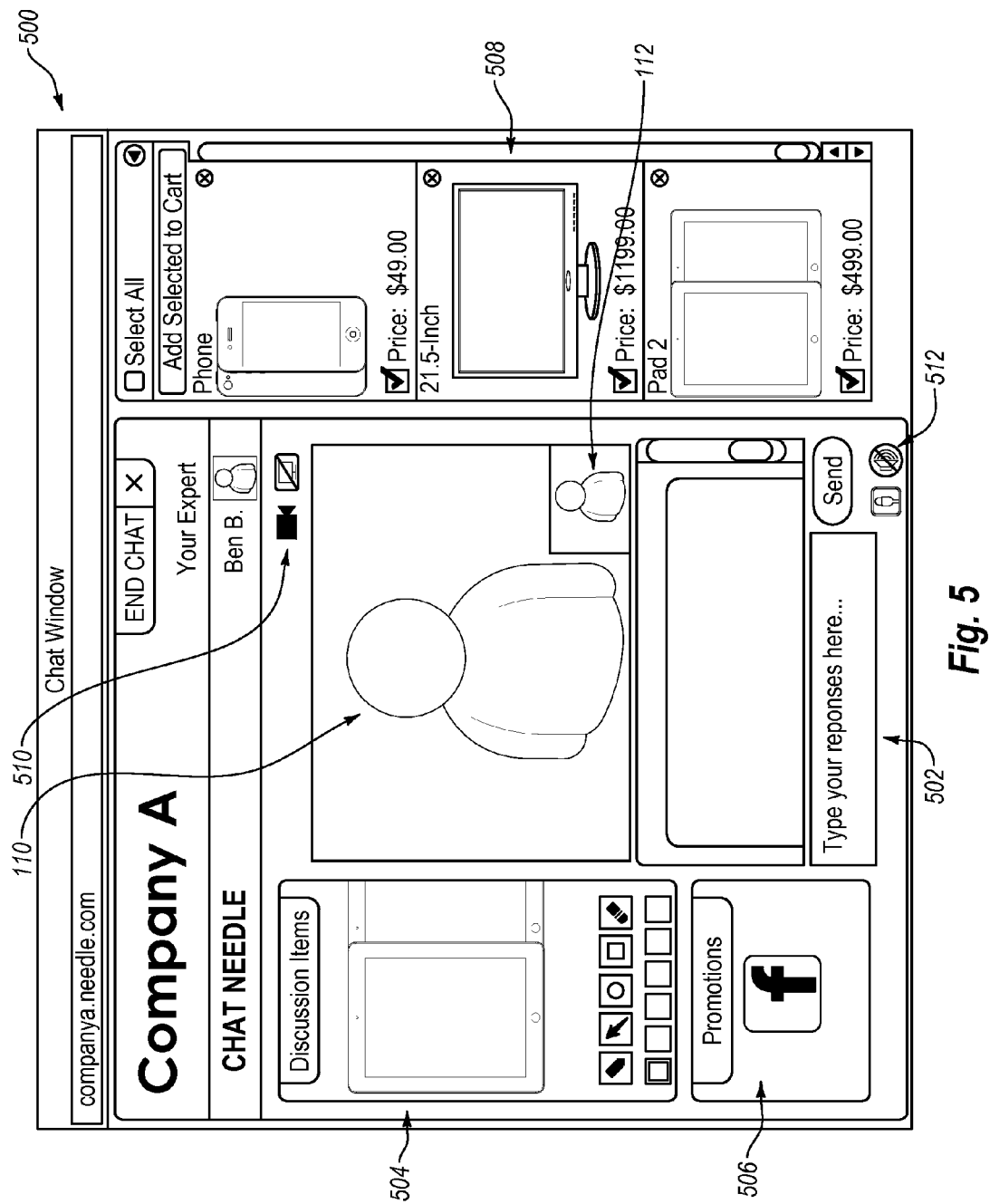
FIG. 5 is a second example chat window.
Figure 6B:
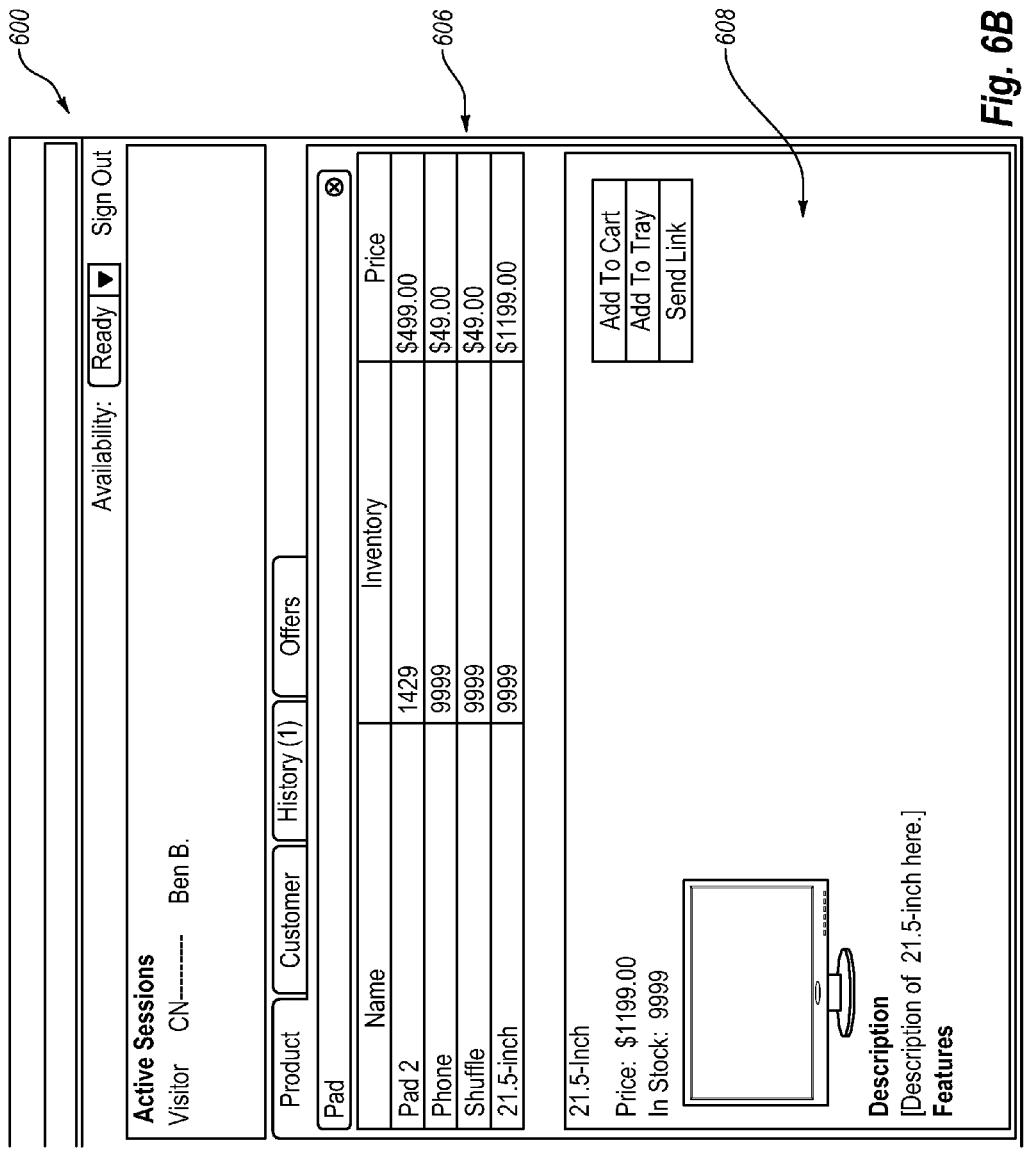

With reference now to FIGS. 5 and 6, a second example chat window 500 and chat console 600 are disclosed. As the chat window 500 and the chat console 600 are similar in many respects to the chat window 300 and the chat console 400, the discussion of the chat window 500 and chat console 600 herein will generally be limited to those aspects that differ from the chat window 300 and the chat console 400.

As disclosed in FIG. 5, the chat window 500 includes a text chat region 502, an interactive region 504, a special offers region 506, a tray region 508, a voice chat region 510, and a video chat region 512.

The voice chat region 510 is configured to allow the visitor 110 to select either a one-way or a two-way voice chat. The video chat region 512 is configured to allow the visitor 110 to select either a one-way or a two-way video chat. In general, the chat window 500 is configured to allow the visitor 110 to enable or disable any combination of the chat regions 502, 510 and 512. For example, the text chat region 502 can be disabled by closing the chat window 500. A two-way voice chat can be enabled by clicking the microphone icon in the voice chat region 510 and a one-way voice chat can be enabled by clicking the mute button in the voice chat region 510. A two way video chat can be enabled by clicking the camera icon in the video chat region 512 and a one-way video chat can be enabled by clicking the screen mute button in the video chat region 512. The video chat region 512 may further be configured to allow the visitor 110, when the visitor 110 has selected a two-way video chat, to select between a large agent video display and miniature visitor video display, a large visitor video display and miniature agent video display (as illustrated in FIG. 5), or equal sized agent and visitor video displays. The use of the audio and video chat may be configured to be controlled by the visitor 110, the agent 112, or both the visitor 110 and the agent 112.

The tray region 508 is configured to display one or more products selected by the agent 112 to the visitor 110. For example, the tray region 508 may be used by the visitor 110 and the agent 112 to consider multiple products and/or promotions simultaneously. For example, the agent 112 can move multiple products and/or promotions into the tray region 508 (using the tray region 604 discussed below) for display to the visitor 110. The multiple products and/or promotions may be related to one another, such as accessories to main products, or may be related in that all are products the visitor is considering for purchase. Once moved into the tray region 508 by the agent 112, the tray region 508 is configured to allow the visitor 110 to remove any displayed product or promotion from the tray region 508 by selecting the "X" button next to the product or promotion. Similarly, the visitor 110 can select any product or promotion in the tray region 508 by selecting the checkbox next to the product or promotion. In addition, the visitor 110 can select all products or promotions in the tray region 508 by selecting the "Select All" checkbox. The visitor 110 can then add the selected productions and/or promotions to the shopping cart of the visitor 110 by selecting the "Add Selected to Cart" button. The visitor 110 can also close the tray region 508 by selecting the left arrow button.

As disclosed in FIG. 6, the chat console 600 includes various regions including an enhanced text chat region 602, a tray region 604, a product catalog region 606, a product detail region 608, a voice chat region 610, and a video chat region 612.

The enhanced text chat region 602 corresponds to the text chat region 502, the voice chat region 610 corresponds to the voice chat region 510, and the video chat region 612 corresponds to the video chat region 512. Thus, the chat regions 602, 610, and 612 enable the agent 112 to text chat, voice chat, video chat, or any combination thereof.

The tray region 604 corresponds to the tray region 508 of the chat window 500. The agent 112 may add products into the tray region 604 from the product catalog region 606, for example, by selecting a product from the product catalog region 606 in a specified way (e.g. double clicking a product) or dragging a product from the product catalog region 606 into the tray region 604. Alternatively, the agent 112 may add products into the tray region 604 from the product detail region 608 by, for example, selecting the "Add to Tray" button.

Once a product is displayed in the tray region 604, the product can be selected by the agent 112 and shown to the visitor 110 in the tray region 508 by selecting the "Show" button, or hidden from the visitor 110 in the tray region 508 by selecting the "Hide" button. The agent 112 can remove any product from the tray region 604 by selecting the "X" button next to the product. Similarly, the agent 112 can select any product in the tray region 604 by selecting the checkbox next to the product. The agent 112 can then add the selected items to the shopping cart of the visitor 110 by selecting the "Add Selected to Cart" button.

4. Example Online Retailer Community Window

With reference now to FIGS. 1, 7A and 7B, additional details regarding an example online retailer community window 108 will be disclosed. FIG. 7A is an example online retailer community window 700. FIG. 7B is a chart of an example point reward system for agent behaviors.

As disclosed in FIG. 7A, an online retailer community session 108 can be displayed to an agent 112 as the online retailer community window 700. The community window 700 may include various regions that facilitate communication between the agent 112 and other personnel of the online retailer. For example, the window 700 includes an agent region 702, a visitor feedback region 704, a leader board region 706, a service provider news region 708, an online retailer news region 710, and an agent statistics region 712.

The agent region 702 can be used by the agent 112 to launch a chat console, such as the chat console 400 disclosed in FIGS. 4A and 4B. Once a chat console 400 is launched, by selecting the "Launch Chat" button for example, the agent 112 can engage in chats with visitors or other agents, engage in offline communication with visitors, or perform peer reviews of other agents' chats, as discussed above in connection with FIGS. 4A and 4B and below in connection with FIGS. 8A-15.

The visitor feedback region 704 can be used by the agent 112 to view visitor feedback that has been received from post-purchase surveys of visitors, for example. The visitor feedback may relate only to feedback received on sales assisted by the agent 112, or may relate to all sales made by any agent of the online retailer.

The leader board region 706 displays the top performing agents of the online retailer. The performance of agents can be tracked and rewarded using various criteria including, but not limited to, visitor satisfaction, response time to incoming chat requests, number of questions asked of a visitor during a chat, number of coupons posted by a visitor on the visitor's social media site, in chat purchases, chat length, and total chats. In addition, the reward for each category of performance can be updated instantly by the online retailer to immediately shift the focus of its agents. For example, the online retailer can immediately encourage the asking of "more than 3 questions" by increasing the points awarded an agent for this behavior from 200 points to 600 points, for example.

The service provider news region 708 displays news about the service provider of the communication system 100 (see FIG. 1). For example, a service provider may maintain and manage the entire communication system 100 and then provide the communication system 100 to one or more online retailers as a service to complement existing online retailer websites. In addition, the service provider news region 708 can be configured such that the agent 112 is forced to acknowledge each news item before the community window 700 will allow the agent to begin work by chatting with visitors. The acknowledgement of the agent 112 on each news item can be stored for future reference to prove that the agent was aware of a news item. Service provider news items may include policy updates and bug reports, for example.

The online retailer news region 710 displays news about the online retailer. Like the service provider news region 708, the online retailer news region 710 can be configured such that the agent is forced to acknowledge each news item and the acknowledgement can be stored for future reference to prove that the agent was aware of a news item. Online retailer news items may include product updates and special promotions, for example.

In one example, the "Launch Chat" button in the agent region 702 may be disabled until the agent 112 acknowledges each news item the service provider news region 708 and each news item in the online retailer news region 710.

The agent statistics region 712 displays statistics of the agent 112. These statistics may include any of the performance criteria discussed above. It is noted that the window 700 may further include a store region (not shown). Once the agent 112 has accumulated rewards (in the form of points) for specific performance, he may spend his points in the store region. The store region displays various products available for purchase using points accumulated by the agent 112. The store region also displays the current performance criteria that form the basis for the rewarding of points by the online retailer. Thus the agent 112 can quickly identify a product of interest as well as the performance behaviors that the agent 112 should exhibit in order to earn the points necessary to obtain the product.

For example, the chart 714 of FIG. 7B discloses an example point reward system for agent behaviors that can be displayed in the store region. For example, when an agent works for a block of time, which is equal to 3 hours of active chat time, the agent will be rewarded points based upon a variety of factors including visitor satisfaction with the agent, average response time, purchases made by a visitor during each chat, agents questions asked during each chat, total number of chats, and facebook coupon posts. The agent can also have points taken away during the block of time for missing chats with a visitor. When an agent works for a stack of time, which equals 24 blocks of time, the agent will be rewarded points based on similar criteria, as shown in FIG. 7B. It is understood that the point values illustrated in FIG. 7B are example values only, and other values can be awarded for the listed agent behaviors. Further, agent behaviors other than those listed in the chart of FIG. 7B can either be encouraged or discouraged using a point reward system.

5. Third Example Chat Console

With reference now to FIGS. 8A-15, a third example chat console is disclosed. In particular, FIGS. 8A-14B are seven different views of a third example chat console 800. As the chat console 800 is similar in many respects to the chat consoles 400 and 600, the discussion of the chat console 800 herein will generally be limited to those aspects that differ from the chat consoles 400 and 600.

Figure 8A:
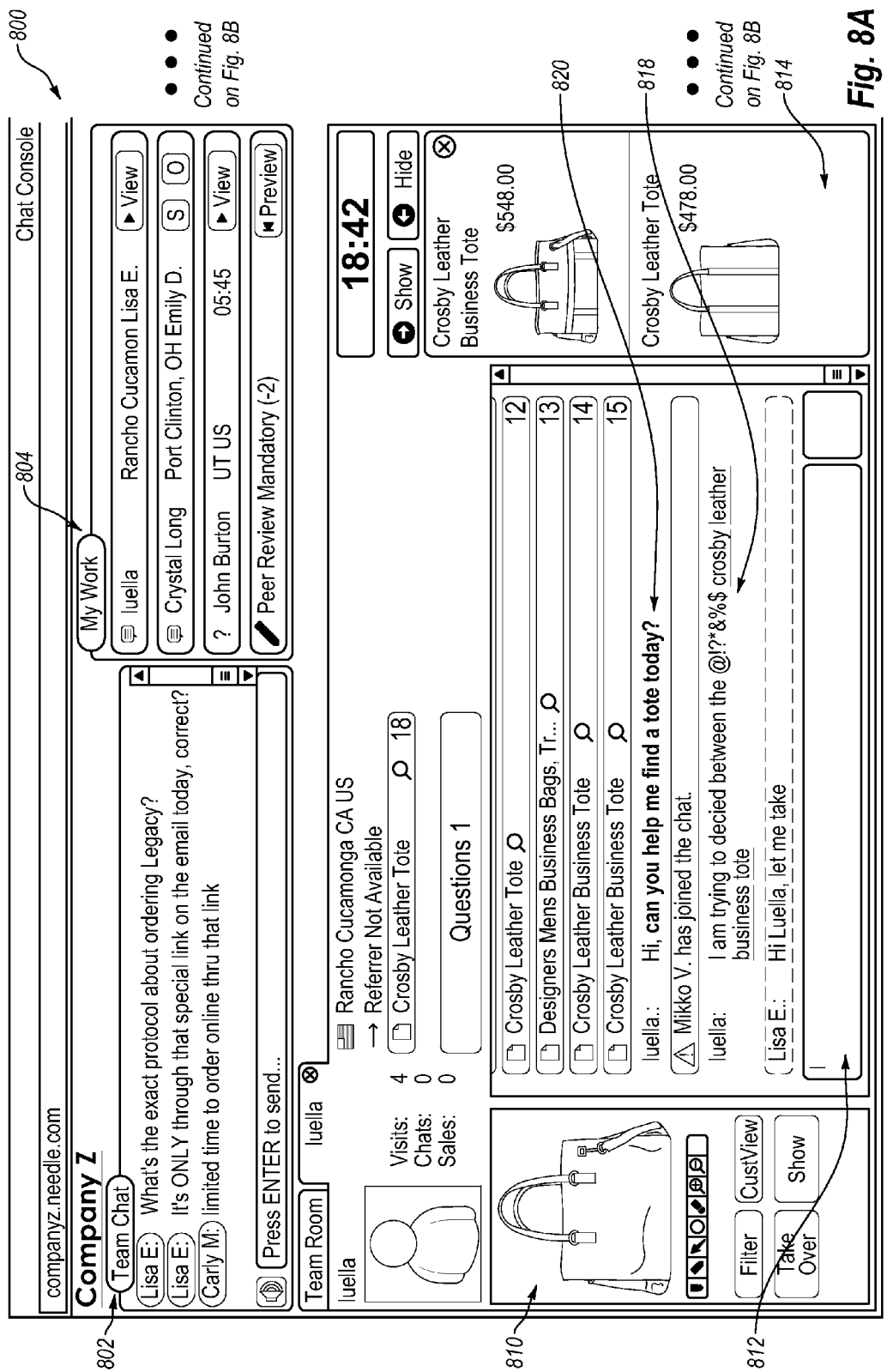
FIGS. 8A and 8B are a first view of a third example chat console.
Figure 8B:
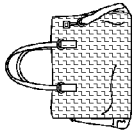

As disclosed in FIGS. 8A and 8B, the chat console 800 may include various regions that facilitate communication between the agent 112 and the visitor 110. For example, the chat console 800 includes a team text chat region 802, an agent task region 804, an available agent region 806, an agent statistics region 808, an interactive region 810, an enhanced text chat region 812, a product tray region 814, and a product catalog region 816.

Like the enhanced text chat region 420 of FIGS. 4A and 4B, the enhanced text chat region 812 is configured with various enhanced communication features. For example, the enhanced text chat region 812 may be configured to analyze text entered by the visitor 110 in the text chat region of the visitor's chat window (such as the text chat region 302 of the chat window 300 of FIG. 3) in order to display to the agent 112 one or more masked terms 818 among the text entered by the visitor 110 that are automatically identified as a sensitive terms. The sensitive term 818 may be one of a vulgar term, a credit card number, or a social security, for example. The masking of sensitive terms may be implemented in order to avoid offending the agent 112 or avoid exposing the agent to private information of the visitor 110, for example.

For example, the enhanced text chat region 812 may further be configured to analyze text entered by the visitor 110 in the text chat region of the visitor's chat window (such as the text chat region 302 of the chat window 300 of FIG. 3) in order to display to the agent 112 a highlighted phrase among the text entered by the visitor 110 that is identified as a question asked by the visitor 110. One such highlighted question is the bolded question 820. The automatic highlighting of visitor questions, such as the question 820, can help the agent 112 to quickly ascertain when text entered by the visitor 110 requires a response.

Figure 9A:
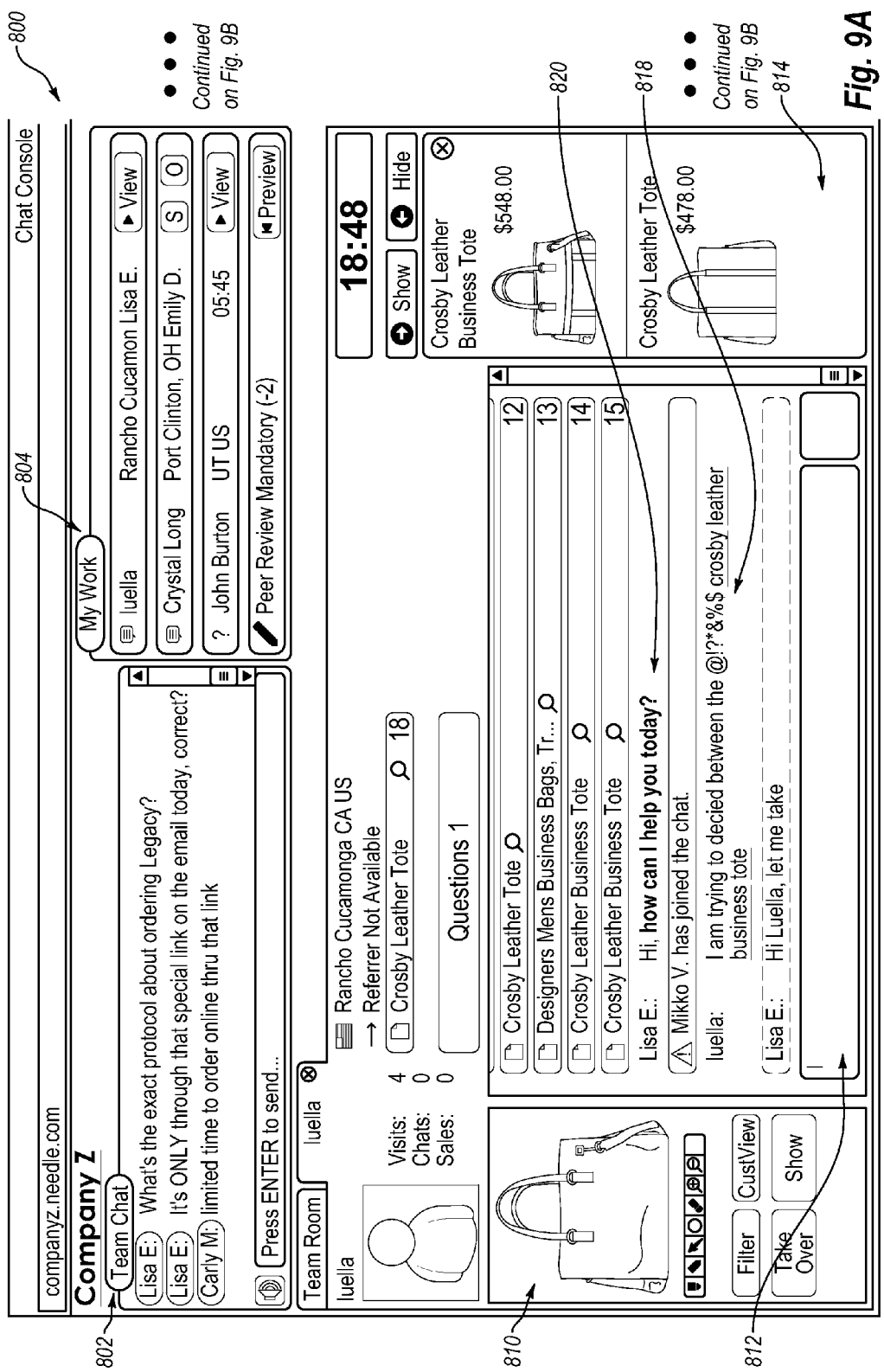

As disclosed in FIGS. 9A and 9B, the chat console 800 further includes a visitor history region 822. The visitor history region 822 displays all previous chats, purchases, and other website interactions with the current visitor 110. For example, the visitor history region 822 displays two chats that the visitor 110 began but then terminated before an agent could respond (both labeled "Intro-bail"), and a previous chat with an agent on Apr. 26, 2012. The visitor history region 822 can be used by the agent 112 to determine what the visitor 110 has done in the past and to predict what the visitor might do during the current chat session.

Figure 10A:
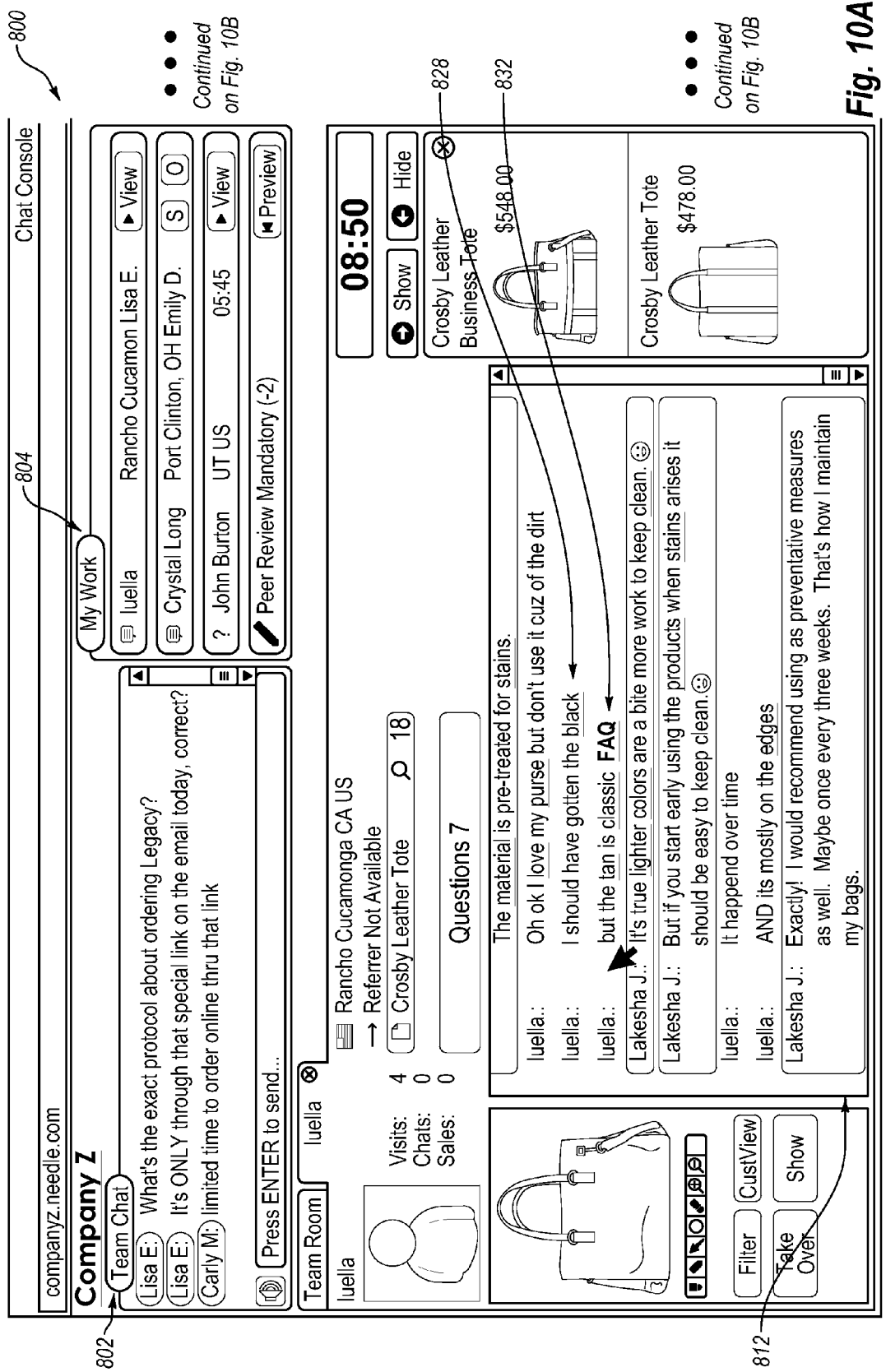
FIGS. 10A and 10B are a third view of the third example chat console of FIGS. 8A and 8B.
Figure 10B:
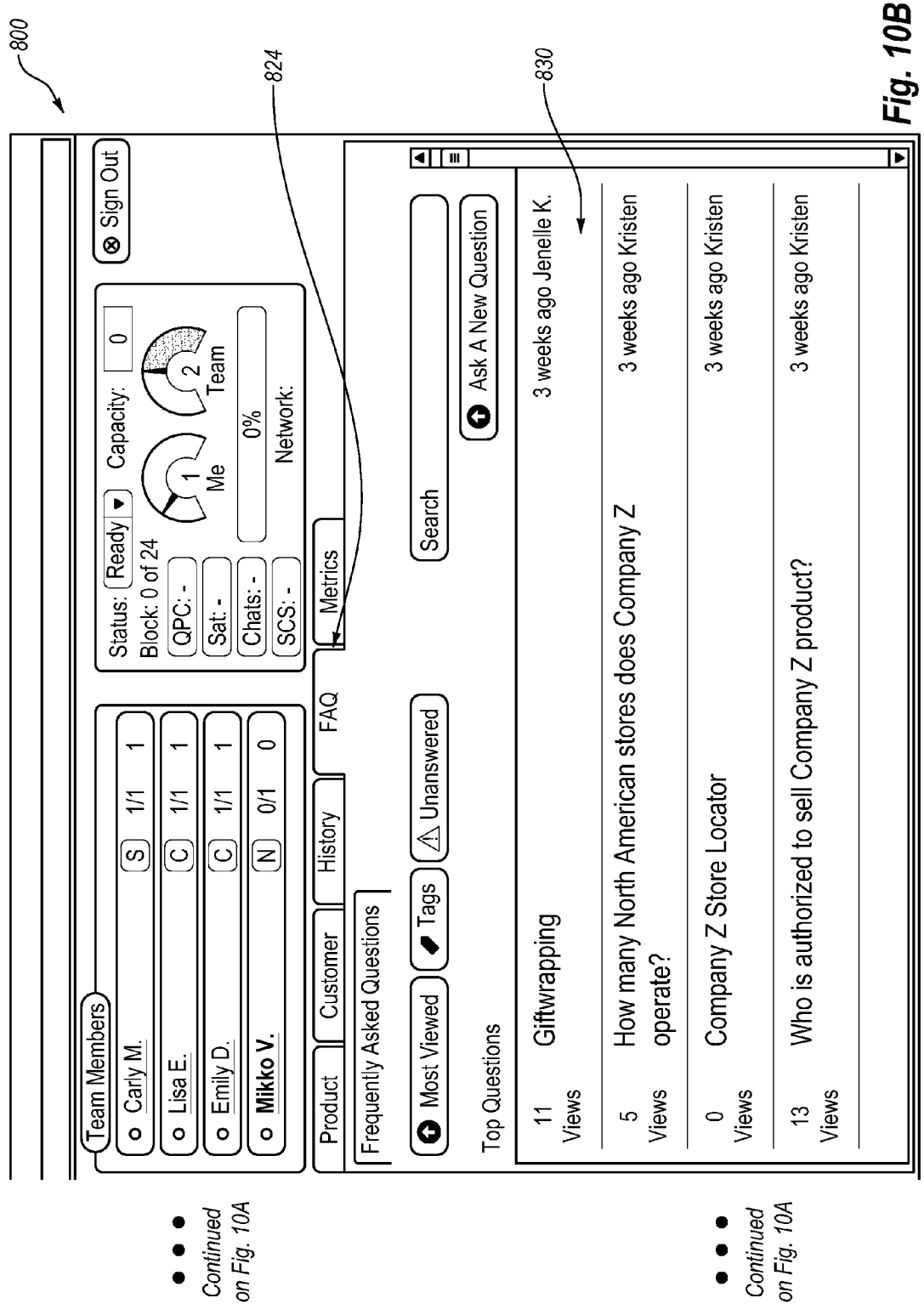

As disclosed in FIGS. 10A and 10B, the chat console 800 further includes a frequently asked questions (FAQ) region 824. The FAQ region 824 is configured to display questions that have been asked by visitors of the website and answers that have been given by agents of the website that are stored in a FAQ database (not shown).

For example, the enhanced text chat region 812 may further be configured to analyze text entered by the visitor 110 in the text chat region of the visitor's chat window (such as the text chat region 302 of the chat window 300 of FIG. 3) in order to display to the agent 112 a highlighted term among the text entered by the visitor 110 that relates to one or more questions stored in the FAQ database. For example, the highlighted terms 828 are configured to cause, upon selection by the agent 112, the questions 830 to be displayed in the FAQ region 824. As illustrated in FIGS. 10A and 10B, the highlighting of the terms 828 may be displayed to the agent upon mouse-over of the text entered by the visitor 110 that relates to the questions 830 stored in the FAQ database. Also, the selection by the agent 112 may be accomplished by clicking a FAQ link 832 that is displayed upon mouse-over of the text entered by the visitor 110 that relates to the questions 830 stored in the FAQ database. This automatic linking to the FAQ region 824 may enable the agent 112 to quickly locate answers to common questions that may be posed by the visitor 110.

Figure 11A:
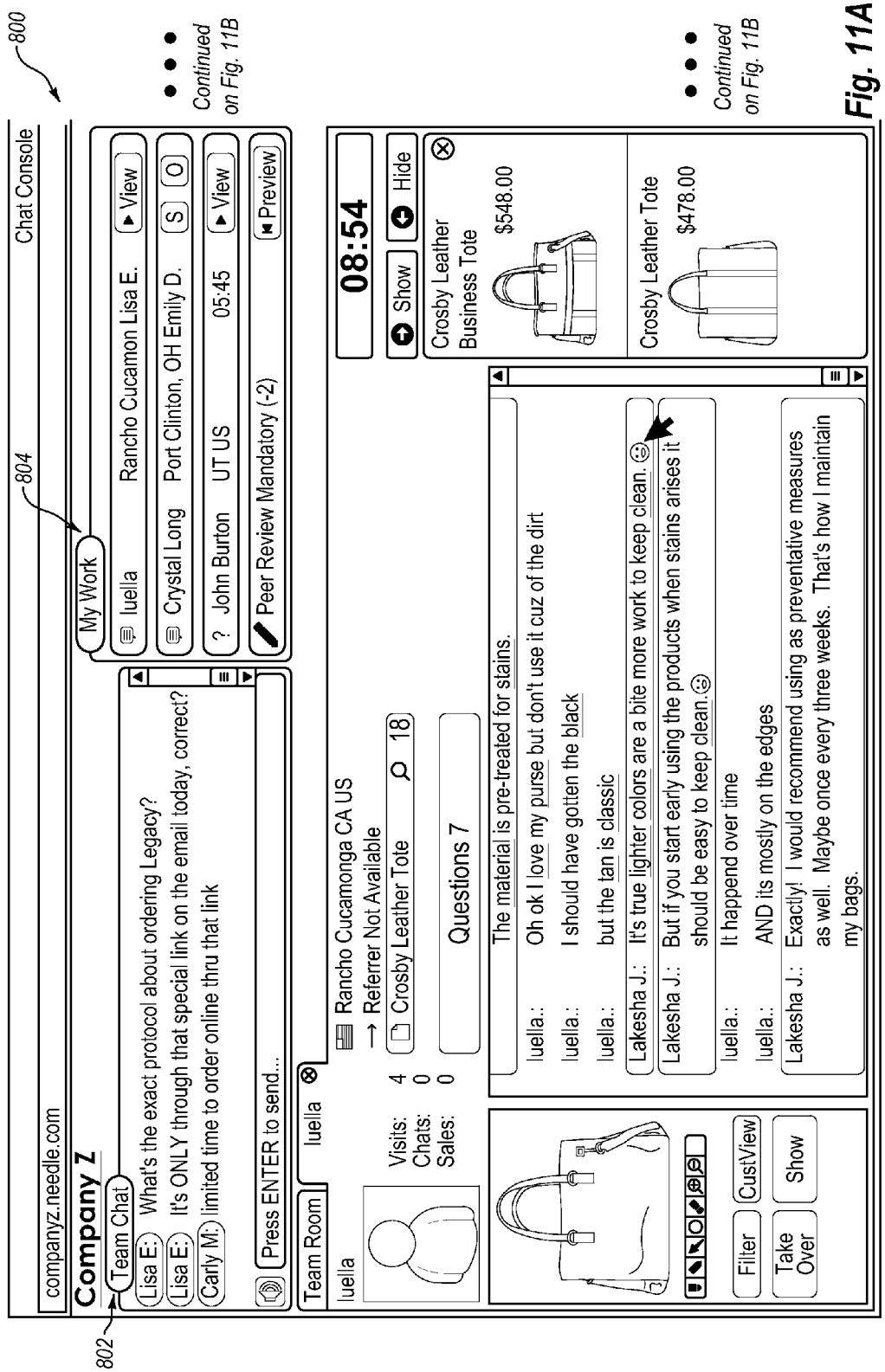
FIGS. 11A and 11B are a fourth view of the third example chat console of FIGS. 8A and 8B.
Figure 11B:
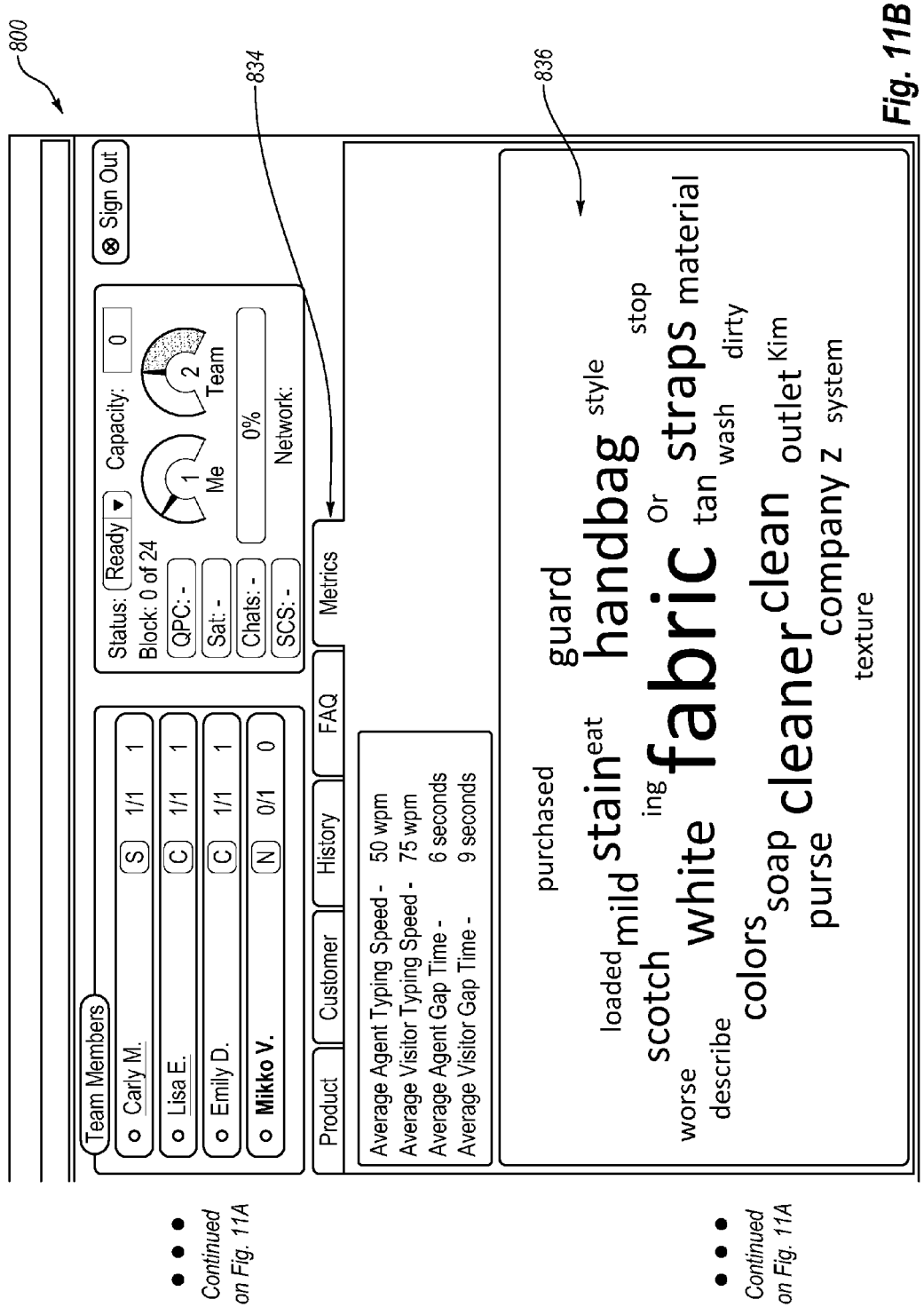

As disclosed in FIGS. 11A and 11B, the chat console 800 further includes a chat metrics region 834. The chat metrics regions 834 may be configured to generate and display various metrics related to the current chat session. These metrics may include, for example, the average typing speed of the agent 112 and the visitor 110 and the average gap time (the time between chat text submission and the beginning of the entering of a response) of the agent 112 and the visitor.

Also, as illustrated in FIGS. 11A and 11B, the chat metrics region 834 may also be configured to generate and display a multi-dimensional tag cloud 836 having multiple dimensions of information about the current chat session between the agent 112 and the visitor 110. For example, the multi-dimensional tag cloud 836 includes three dimensions of information.

The first dimension of information is represented by the chat terms included in the multi-dimensional tag cloud 836, where each chat terms has appeared in the chat. It is noted that not every term in the chat need be included in the multi-dimensional tag cloud 836. For example, chat terms that have appeared in the chat that are listed in an "insignificant term" database may be excluded from the multi-dimensional tag cloud 836.

The second dimension of information is represented by the size of each chat term included in the multi-dimensional tag cloud 836, where the size of each chat term indicates the frequency of the chat term in the chat. For example, larger chat terms in the multi-dimensional tag cloud 836 may be terms that appeared in the chat more frequently than smaller chat terms in the multi-dimensional tag cloud 836.

The third dimension of information is represented by the color of each chat term included in the multi-dimensional tag cloud 836, where the color of each chat term indicates the level of balance between the use of the chat term by the visitor 110 and the agent 112 in the chat. For example, chat terms in the multi-dimensional tag cloud 836 that were used in the chat only by the agent 112 may have a first color, chat terms in the multi-dimensional tag cloud 836 that were used in the chat only by the visitor 110 may have a second color, and each chat term in the multi-dimensional tag cloud 836 that was used in the chat by both the agent 112 and the visitor 110 may have a color that is a shade between the first color and the second color. For example, the shade of the color of a chat term in the multi-dimensional tag cloud 836 that was used in the chat by both the agent and the visitor may be closer to the first color where the chat term was used more by the agent 112 and may be closer to the second color where the chat term was used more by the visitor 110.

In the example illustrated in FIGS. 11A and 11B, the first color is red and the second color is blue. Therefore, chat terms in the multi-dimensional tag cloud 836 that are red were used only by the agent 112, chat terms in the multi-dimensional tag cloud 836 that are blue were used only by the visitor 110, and chat terms that are one of fourteen (14) shades between red and blue were used by both the agent 112 and the visitor 110. Where the shade is closer to red, the chat term was used more by the agent 112 than the visitor 110. Where the shade is closer to blue, the chat terms was used by the visitor 110 more than the agent 112. A shade that is about midway between red and blue was used about evenly by the agent 112 and the visitor 110. It is understood that red, blue, and shades in between red and blue is but one example color scheme, and other color schemes are possible to represent the third dimension of information. It is also noted that noted that a similar multi-dimensional cloud tag may be generated from terms used multiple chats between agent(s) and visitor(s).

The multi-dimensional tag cloud 836 can enable the agent 112 to determine at a glance what chat terms appeared in a chat, (the first dimension of data), how frequently each chat term appeared in the chat (the second dimension of data), and the level of balance between the use of the chat term between the visitor 110 and the agent 112 in the chat (the third dimension of data). The multi-dimensional tag cloud 836 can be included in the communications system 100 in the agent console sessions 104 or the online retailer community sessions 108 to give feedback to agents, other online retailer personnel, service providers, or some combination thereof.

Figure 12A:
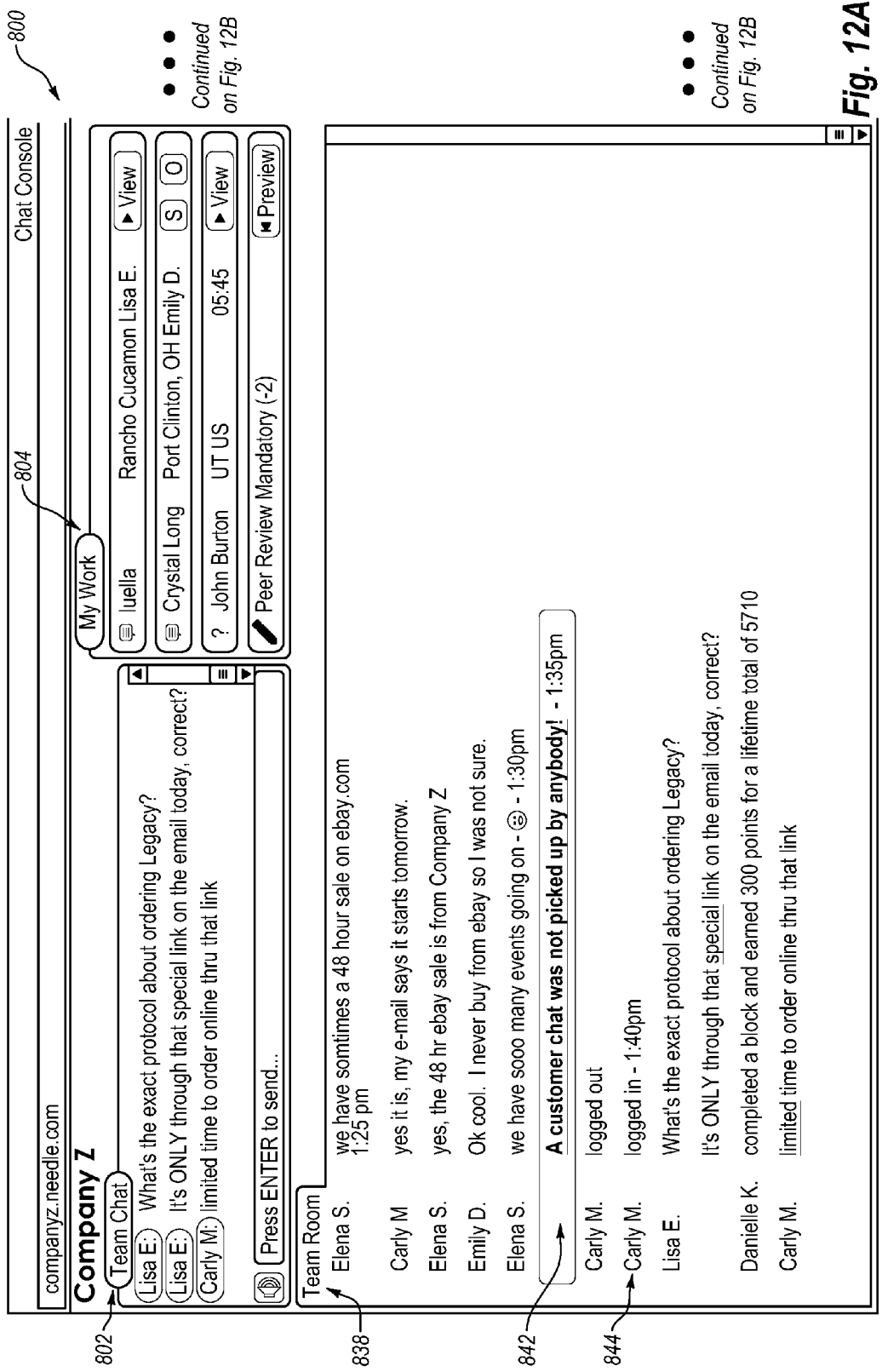

As disclosed in FIGS. 12A and 12B, the chat console 800 further includes a team room region 838. The team room region 838 may include an enhanced team chat region 840 that is an enhanced version of the team chat region 802. In particular, team chat region 802 generally displays only the text entered by agents and other personnel using chat consoles in communication with the chat console 800, while the enhanced team chat region 840 additional displays automatically generated messages, such as the messages 842 and 844.

Also disclosed in FIGS. 12A and 12B, each of the agents listed in the available agent region may be linked to a pop-up window, such as the pop-up window 846, that displays additional information and statistics about the selected agent. For example, the pop-up window 846 may be launched by the agent 112 clicking on the linked name "Emily D." 848.

Figure 13A:
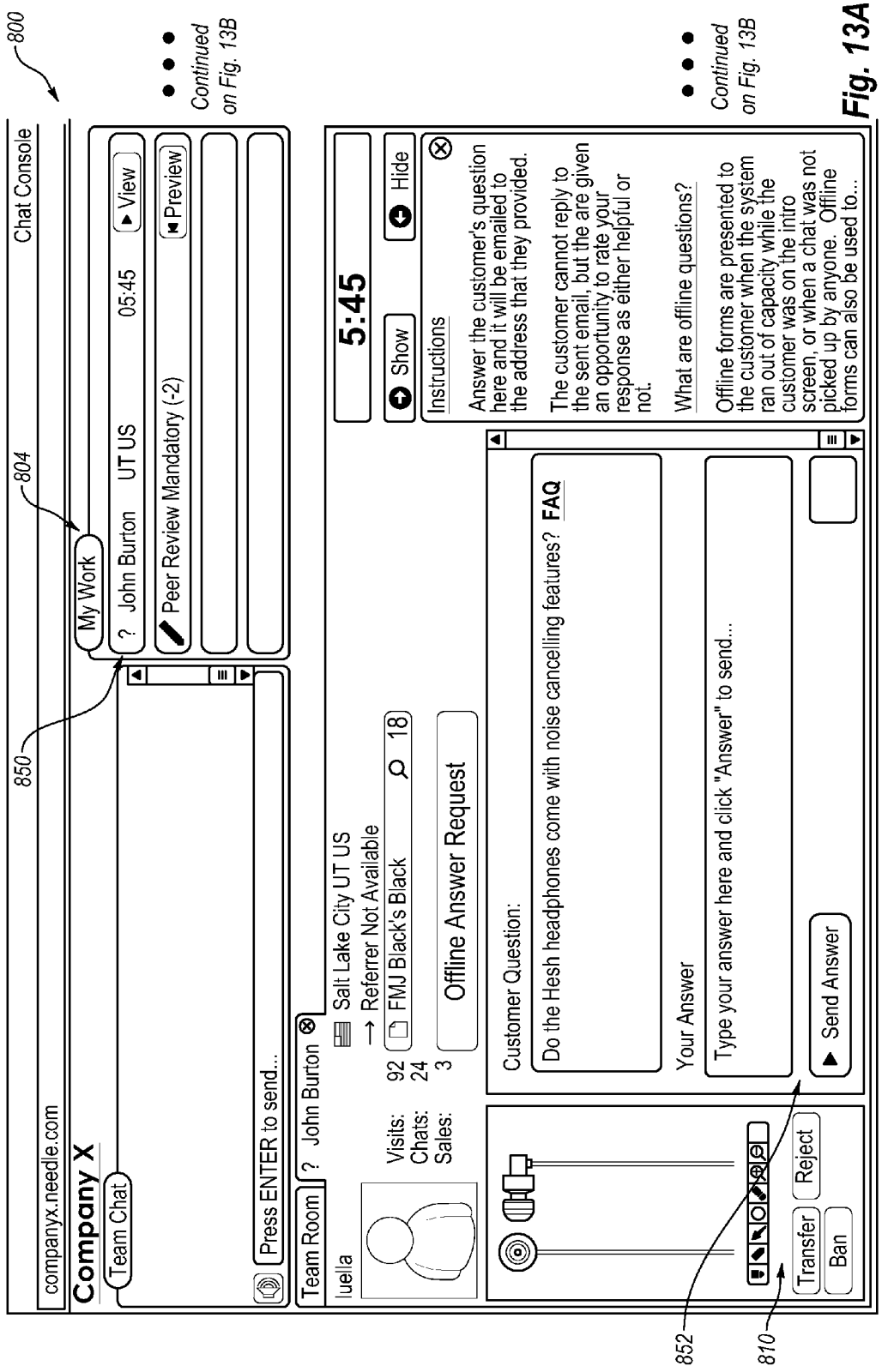
FIGS. 13A and 13B are a sixth view of the third example chat console of FIGS. 8A and 8B.
Figure 13B:
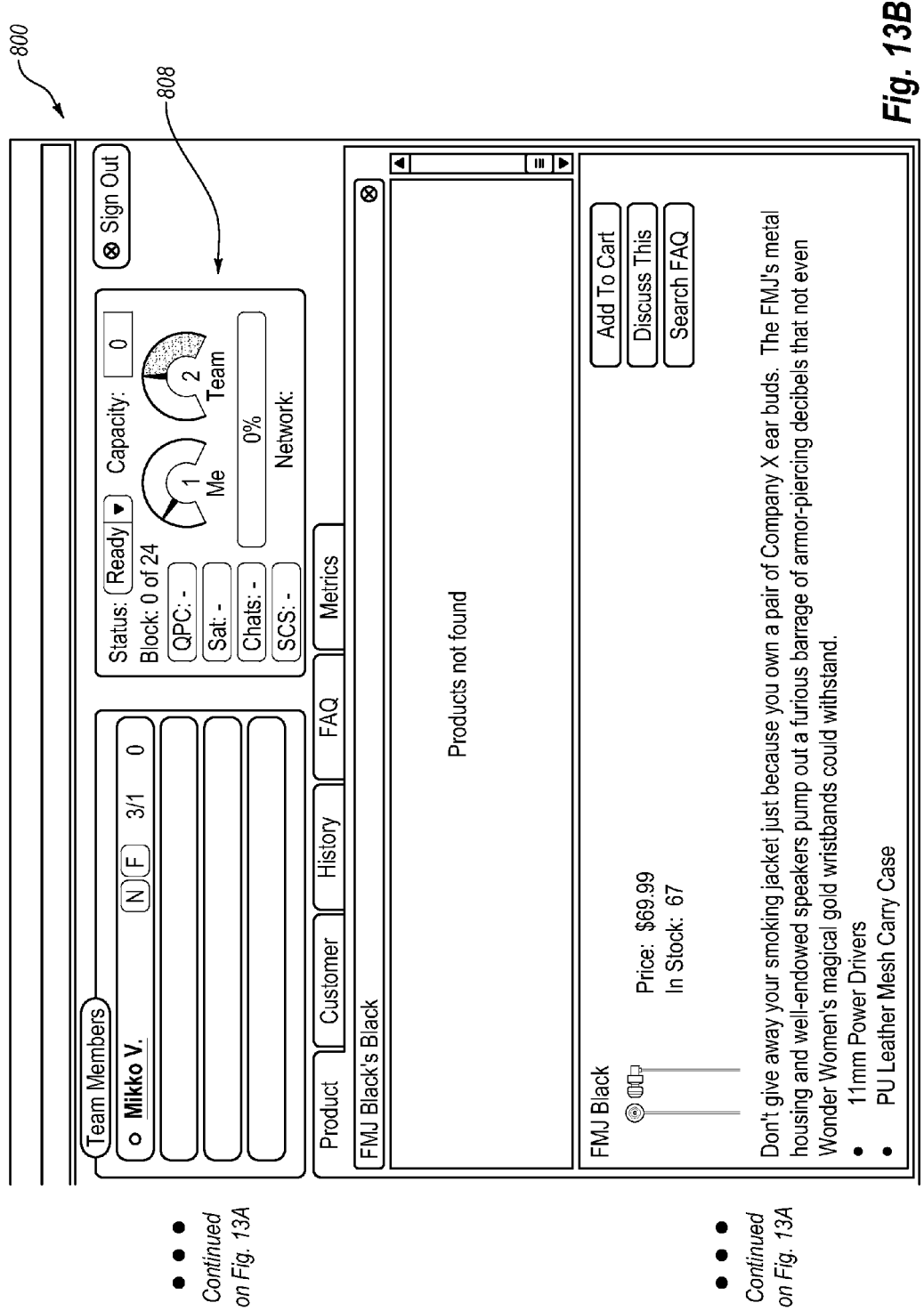

As disclosed in FIGS. 13A and 13B, in additional to real-time chats with visitors, the chat console 800 also enables the agent 112 to engage in offline communication with visitors. For example, where a visitor attempts to chat with an agent, but no agents are available or no agent responds to the chat request, the visitor may leave an offline message for an agent. One such offline message request task 850 is listed in the agent task region 804. When the agent 112 selects the offline message request task 850, an offline text response region 852 is displayed which displays the question posed by the previous visitor and allows the agent to enter a text answer to the question. The answer may be transmitted to the visitor in a non-real time system, such as through email. In addition the text response, any markup of the image of the product selected by that visitor that is displayed in the interactive region 810 may also be transmitted to the visitor.

Figure 14A:
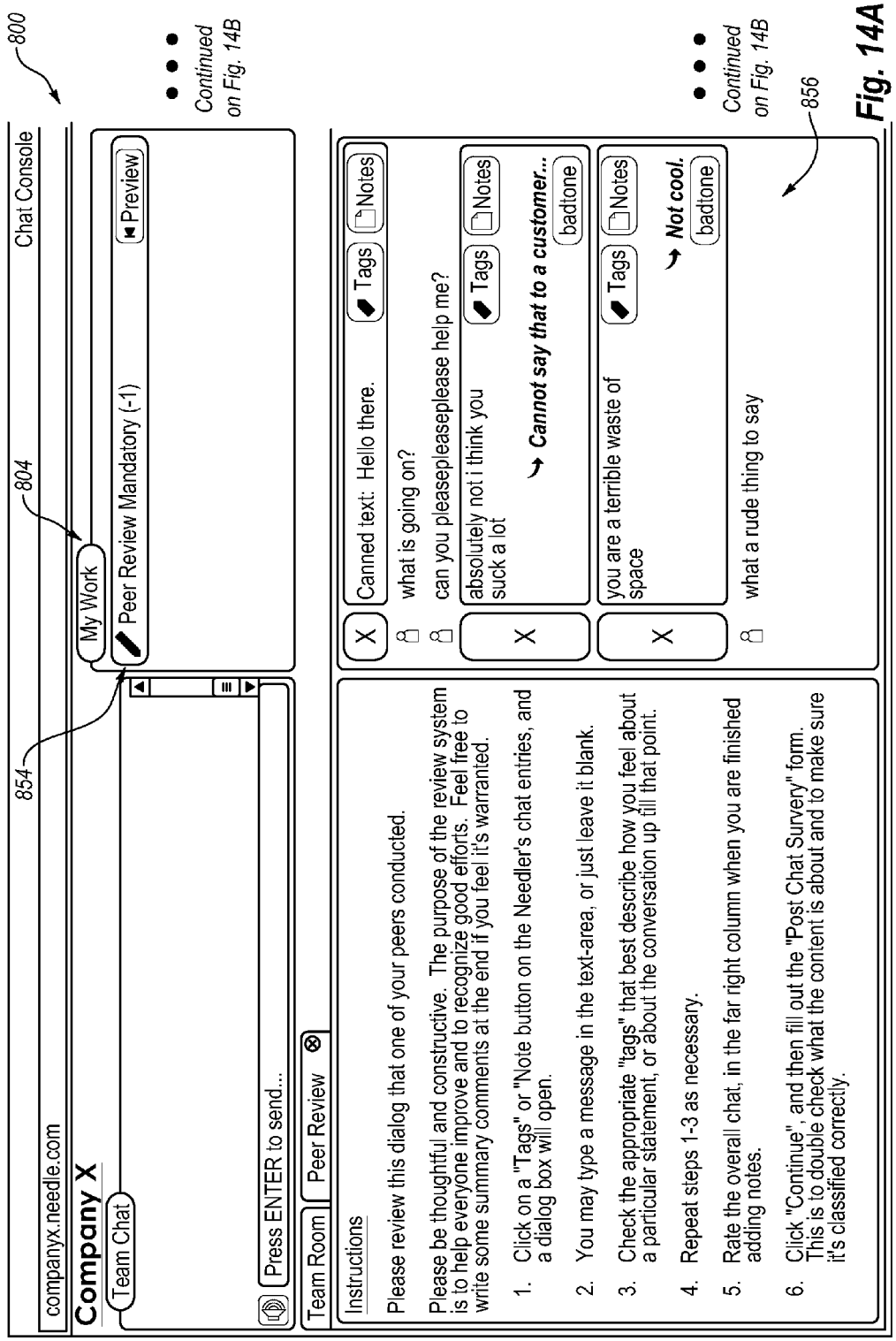

As disclosed in FIGS. 14A and 14B, in additional to real-time chats and offline communication with visitors, the chat console 800 also enables the agent 112 perform peer reviews on other agents. For example, where an agent peer review is manually initiated or automatically initiated by the communication system 100, a peer review task may be generated for the agent 112. One such peer review task 854 is listed in the agent task region 804. When the agent selects the peer review task 854, a peer review region 856 is displayed in the chat console 800. The peer review region 856 is configured to display a completed chat between another agent and a visitor. The peer review region is also configured to enable the agent 112 to rate the performance of other agent during the completed chat.

As illustrated in FIGS. 14A and 14B, the peer review region 856 may be configured to enable the agent 112 to rate the performance of each individual submission of text by the second agent. This may be accomplished using the "Tags" button, which allows the agent 112 to select from several predefined "canned" rating tags to rate a submission, the "Note" button, which allows the agent 112 to enter a custom notes to rate the submission, or some combination thereof.

As further illustrated in FIGS. 14A and 14B, the peer review region 856 may also or alternatively be configured enable the agent 112 to rate the performance of the other agent during the completed chat on the overall performance of the other agent. This may be accomplished "Poor," "Average," and "Good" radio buttons and the text field in the peer review region 856.

As disclosed in FIG. 15, the data gathered using the peer review region 856, and other similar peer review regions of other chat consoles, can be compiled in a database and used to generate the example peer review report 900 of FIG. 15. As illustrated in FIG. 15, the example peer review report 900 can be used to determine whether certain agents are performing reviews, the quality of those reviews, and how agents are rated by their peer agents. These determinations can then be used to better train agents in areas where improvement is needed. The example peer review report 900 of FIG. 15 may be accessed, for example, through the example online retailer community window of FIG. 7A.

The example embodiments disclosed herein may be embodied in other specific forms. The example embodiments disclosed herein are to be considered in all respects only as illustrative and not restrictive.

What is claimed is:

1. One or more non-transitory computer-readable media storing one or more programs that are configured, when executed on one or more web servers, to cause the one or more web servers to generate a chat window configured to facilitate communication between a human visitor of a website and a human agent of the website, the chat window comprising:
   a text chat region configured to send look-ahead text entered by the human visitor to a second text chat region of an agent console for display to the human agent while the look-ahead text is actually being entered and prior to a submission of the look-ahead text, the text chat region further configured to receive chat text entered by the human agent in the second text chat region of the agent console only after a submission of the chat text.

2. The one or more non-transitory computer-readable media as recited in claim 1, wherein the chat window further comprises an interactive region configured to display to the human visitor one or more products selected by the human visitor, the interactive region including one or more markup tools that enable the human visitor to markup the one or more products during a chat with the human agent, the interactive region being in communication with a second interactive region of the agent console, the second interactive region configured to display the one or more products selected by the human visitor to the human agent, the second interactive region including one or more markup tools that enable the human agent to markup the one or more products during a chat with the human visitor.

3. The one or more non-transitory computer-readable media as recited in claim 1, wherein the chat window further comprises a tray region configured to display one or more products selected by the human agent to the human visitor.

4. The one or more non-transitory computer-readable media as recited in claim 3, wherein the tray region is configured to allow the human visitor to remove each displayed product from the tray region.

5. The one or more non-transitory computer-readable media as recited in claim 3, wherein the tray region is configured to allow the human visitor to add each displayed product to a shopping cart of the human visitor.

6. The one or more non-transitory computer-readable media as recited in claim 1, wherein the chat window further comprises:
   a voice chat region configured to allow the human visitor to select either a one-way or a two-way voice chat; and
   a video chat region configured to allow the human visitor to select either a one-way or a two-way video chat,
   wherein the chat window is configured to allow the human visitor to enable or disable any combination of the chat regions.

7. The one or more non-transitory computer-readable media as recited in claim 6, wherein the video chat region is configured to allow the human visitor, when the human visitor has selected a two-way video chat, to select equal-sized agent and visitor video displays.

* * * * *